US012754926B2

(12) United States Patent
Narayanaswamy et al.

(10) Patent No.: US 12,754,926 B2
(45) Date of Patent: Oct. 6, 2026

(54) SYSTEMS, METHODS, AND INTERFACE FOR GENERATING A UNIFIED ASSET KNOWLEDGE GRAPH AND ONTOLOGY FOR CLOUD-BASED ASSETS

(71) Applicant: Oracle International Corporation, Redwood Shores, CA (US)

(72) Inventors: Sreedhara Srinivasulu Narayanaswamy, Bengaluru (IN); Ali Shemshadi, Perth (AU); Ramya Janarthanan, Chennai (IN); Srinath Achanta, Singapore (SG); Liang Kwee Tan, Singapore (SG)

(73) Assignee: Oracle International Corporation, Redwood Shores, CA (US)

( * ) Notice: Subject to any disclaimer, the term of this patent is extended or adjusted under 35 U.S.C. 154(b) by 189 days.

(21) Appl. No.: 18/230,016

(22) Filed: Aug. 3, 2023

(65) Prior Publication Data

US 2025/0045287 A1 Feb. 6, 2025

(51) Int. Cl.
*G06F 16/20* (2019.01)
*G06F 16/248* (2019.01)
*G06F 16/25* (2019.01)

(52) U.S. Cl.
CPC .......... *G06F 16/252* (2019.01); *G06F 16/248* (2019.01)

(58) Field of Classification Search
CPC ............................. G06F 16/252; G06F 16/248
USPC ......................................................... 707/722
See application file for complete search history.

(56) References Cited

U.S. PATENT DOCUMENTS

| | | | |
|---|---|---|---|
| 10,498,674 B2 | 12/2019 | Sagar | |
| 10,620,923 B2 | 4/2020 | Allan | |
| 11,355,242 B2 | 6/2022 | Sailer | |
| 11,494,665 B2 | 11/2022 | Crabtree | |
| 11,538,586 B2 | 12/2022 | Wang | |
| 11,558,440 B1 | 1/2023 | Tadesse | |
| 11,693,896 B2 | 7/2023 | Mihindukulasooriya | |
| 11,706,339 B2 | 7/2023 | Adibi | |
| 2018/0129959 A1* | 5/2018 | Gustafson | G06N 20/00 |
| 2019/0340252 A1* | 11/2019 | Huyghe | G06F 16/438 |

(Continued)

FOREIGN PATENT DOCUMENTS

EP 4181030 A1 * 5/2023

*Primary Examiner* — Daniel A Kuddus
(74) *Attorney, Agent, or Firm* — Mughal Gaudry & Franklin PC

(57) ABSTRACT

A computer system including at least one server executing a backend application and communicatively coupled with a client device executing a frontend application is disclosed. The backend application is configured to receive a search criterion using a first input control, and a search query term using a second input control. Based on the type of search criterion and using the search query term, the backend application is configured to identify a set of cloud-based tools from a plurality of cloud-based tools stored in a database, where at least some of the cloud-based tools are deployable to a user cloud-based computing environment and need additional assets to deploy a cloud-based tool to the user cloud-based computing environment. The backend application is configured to build and deploy, to the user cloud-based computing environment, a user-selected cloud-based tool and the additional assets identified for the user-selected cloud-based tool using initial configuration parameters.

26 Claims, 16 Drawing Sheets

(56) References Cited

U.S. PATENT DOCUMENTS

| | | | | |
|---|---|---|---|---|
| 2021/0271886 | A1 | 9/2021 | Zheng | |
| 2021/0326346 | A1 | 10/2021 | Rivlin | |
| 2022/0108070 | A1 | 4/2022 | Syeda-Mahmood | |
| 2022/0309037 | A1* | 9/2022 | Gutierrez | G06F 16/16 |
| 2022/0335553 | A1* | 10/2022 | Chew | G06F 16/35 |
| 2023/0113327 | A1* | 4/2023 | Banerjee | H04L 67/147 709/226 |
| 2023/0135553 | A1* | 5/2023 | Cella | B33Y 50/02 |
| 2023/0214096 | A1* | 7/2023 | Arora | G06F 3/04817 715/764 |
| 2024/0143409 | A1* | 5/2024 | Bhardwaj | G06F 9/505 |

* cited by examiner

SYSTEMS, METHODS, AND INTERFACE FOR GENERATING A UNIFIED ASSET KNOWLEDGE GRAPH AND ONTOLOGY FOR CLOUD-BASED ASSETS

TECHNICAL FIELD

The field of the disclosure relates to searching for cloud-based assets, and in particular, to systems, methods and user interface for generating a unified asset knowledge graph and ontology for use in searching for cloud-based assets.

BACKGROUND

Many organizations are moving towards a cloud-based computing system or a cloud-based hosting environment so that the organization can benefit from more resources or assets that can be available for their use as compared to a local computing system or local hosting environment. While a cloud-based computing system offers the benefits of a large pool of assets being available to a user, it can be difficult for a user to identify all such assets that are available to the user, and to identify which asset would be more appropriate for the user for a particular application.

Thus, it would be desirable to provide an interface that can help a user to identify the most relevant assets more easily for a particular application or use.

BRIEF DESCRIPTION

In one aspect, a computer system including at least one server executing a backend application is disclosed. The at least one server is communicatively coupled with a client device executing a frontend application. The backend application is configured to cause to display a user interface of the frontend application on a display of the client device. The user interface includes a plurality of input controls including a first input control and a second input control. The first input control is configured to enable a user of the client device to input a type of search criterion to be applied to a search, and the second input control is configured to receive input from the user of the client device corresponding to a search query term. The backend application is configured to determine the type of search criterion and the search query term from the received message, in response to receiving a message from the frontend application. The backend application is configured to search a database storing a plurality of cloud-based tools to identify a set of cloud-based tools of the plurality of cloud-based tools based on the determined type of search criterion and using the search query term. Each cloud-based tool of the set of cloud-based tools has pre-assigned properties associated with the search criterion that match the search query term. At least some of the cloud-based tools of the set of cloud-based tools are deployable to a user cloud-based computing environment. The backend application is configured to identify additional assets for each identified cloud-based tool. The additional assets are needed to deploy the identified cloud-based tool to the user cloud-based computing environment. The backend application is configured to send, to the client device, a response message including data corresponding to each cloud-based tool of the set of cloud-based tools and the additional assets identified for each cloud-based tool. The backend application is configured to receive, from the user and based on the response message sent to the client device, a selection of a cloud-based tool of the set of cloud-based tools for deployment to the user cloud-based computing environment, and identify initial configuration parameters for deployment of the selected cloud-based tool and the additional assets identified for the selected cloud-based tool. The backend application is configured to build and deploy, to the user cloud-based computing environment, the selected cloud-based tool and the additional assets identified for the selected cloud-based tool using the initial configuration parameters.

In another aspect, a computer-implemented method including causing display of a user interface of a frontend application on a display of a client device. The user interface includes a plurality of input controls including a first input control configured to enable a user of the client device to input a type of search criterion to be applied to a search, and a second input control configured to receive input from the user of the client device corresponding to a search query term. The method includes, in response to receiving a message from the frontend application, determining the type of search criterion and the search query term from the received message, and based on the determined search criterion and using the search query term, identifying a set of cloud-based tools of a plurality of cloud-based tools by searching a database storing the plurality of cloud-based tools. Each cloud-based tool of the set of cloud-based tools has properties associated with the determined type of search criterion that match the search query term. One or more cloud-based tools of the set of cloud-based tools are deployable to a user cloud-based computing environment. The method includes for each cloud-based tool of the set of cloud-based tools, identifying one or more additional assets that are needed to deploy a respective cloud-based tool of the set of cloud-based tools to the user cloud-based computing environment. The method includes sending, to the client device, a response message that includes data corresponding to each cloud-based tool of the set of cloud-based tools and the one or more additional assets needed to deploy each cloud-based tool. The method includes receiving, from the user and based on the response message sent to the client device, a selection of a particular cloud-based tool of the set of cloud-based tools for deployment to the user cloud-based computing environment and identifying initial configuration parameters for deployment of the particular cloud-based tool and the one or more additional assets needed for deploying the particular cloud-based tool. The method includes building and deploying, to the user cloud-based computing environment, the particular cloud-based tool and the one or more additional assets identified for the selected cloud-based tool using the initial configuration parameters.

In yet another aspect, a non-transitory computer-readable medium (CRM) embodying programmed instructions is disclosed. The programmed instructions, which, when executed by at least one processor of a backend system cause the at least one processor to cause to display a user interface of a frontend application on a display of a client device. The user interface includes a plurality of input controls including a first input control and a second input control. The first input control is configured to enable a user of the client device to input a type of search criterion to be applied to a search, and the second input control is configured to receive input from the user of the client device corresponding to a search query term. The programmed instructions cause the at least one processor to, in response to receiving a message from the frontend application, determine the type of search criterion and the search query term from the received message, and based on the determined type of search criterion and using the search query term, search a database storing a plurality of cloud-based tools to identify a set of cloud-based tools of the plurality of cloud-based tools. Each cloud-based tool of the set of cloud-based tools has pre-assigned properties associated with the search criterion that match the search query term. At least some of the cloud-based tools of the set of cloud-based tools are deployable to a user cloud-based computing environment. The programmed instructions cause the at least one processor to, for each identified cloud-based tool, identify additional assets that are needed to deploy the identified cloud-based tool to the user cloud-based computing environment, and send, to the client device, a response message including data corresponding to each cloud-based tool of the set of cloud-based tools and the additional assets identified for each cloud-based tool. The programmed instructions cause the at least one processor to, receive, from the user and based on the response message sent to the client device, a selection of a cloud-based tool of the set of cloud-based tools for deployment to the user cloud-based computing environment. The programmed instructions cause the at least one processor to identify initial configuration parameters for deployment of the selected cloud-based tool and the additional assets identified for the selected cloud-based tool, and build and deploy, to the user cloud-based computing environment, the selected cloud-based tool and the additional assets identified for the selected cloud-based tool using the initial configuration parameters.

DRAWINGS

These and other features, aspects, and advantages of the present disclosure will become better understood when the following detailed description is read with reference to the accompanying drawings in which like characters represent like parts throughout the drawings.

Figure 3A:
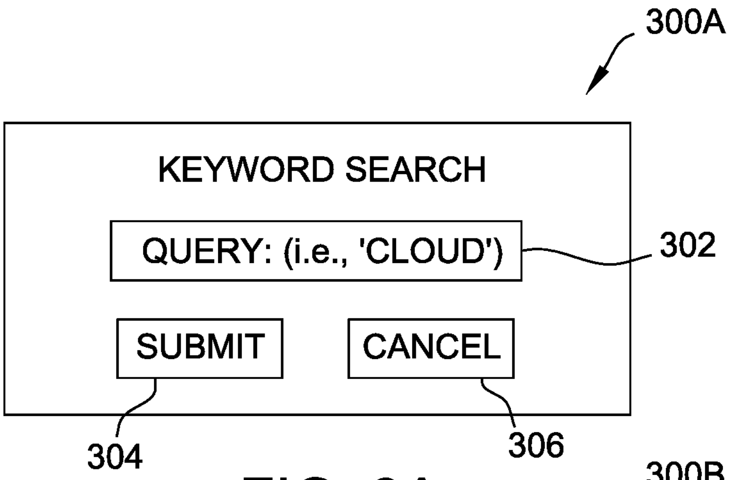
Figure 3B:
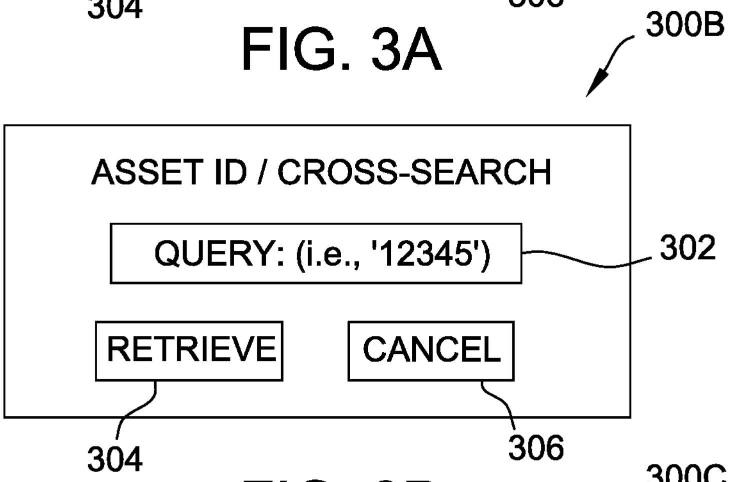
Figure 3C:
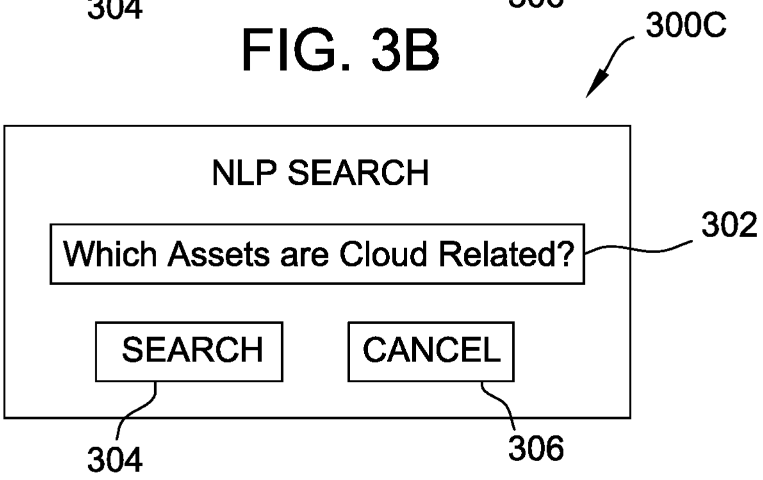

FIGS. 3A, 3B, and 3C depict other example views of the UI of the frontend application executing on the client device in accordance with exemplary embodiments of the present disclosure.

Figure 4A:
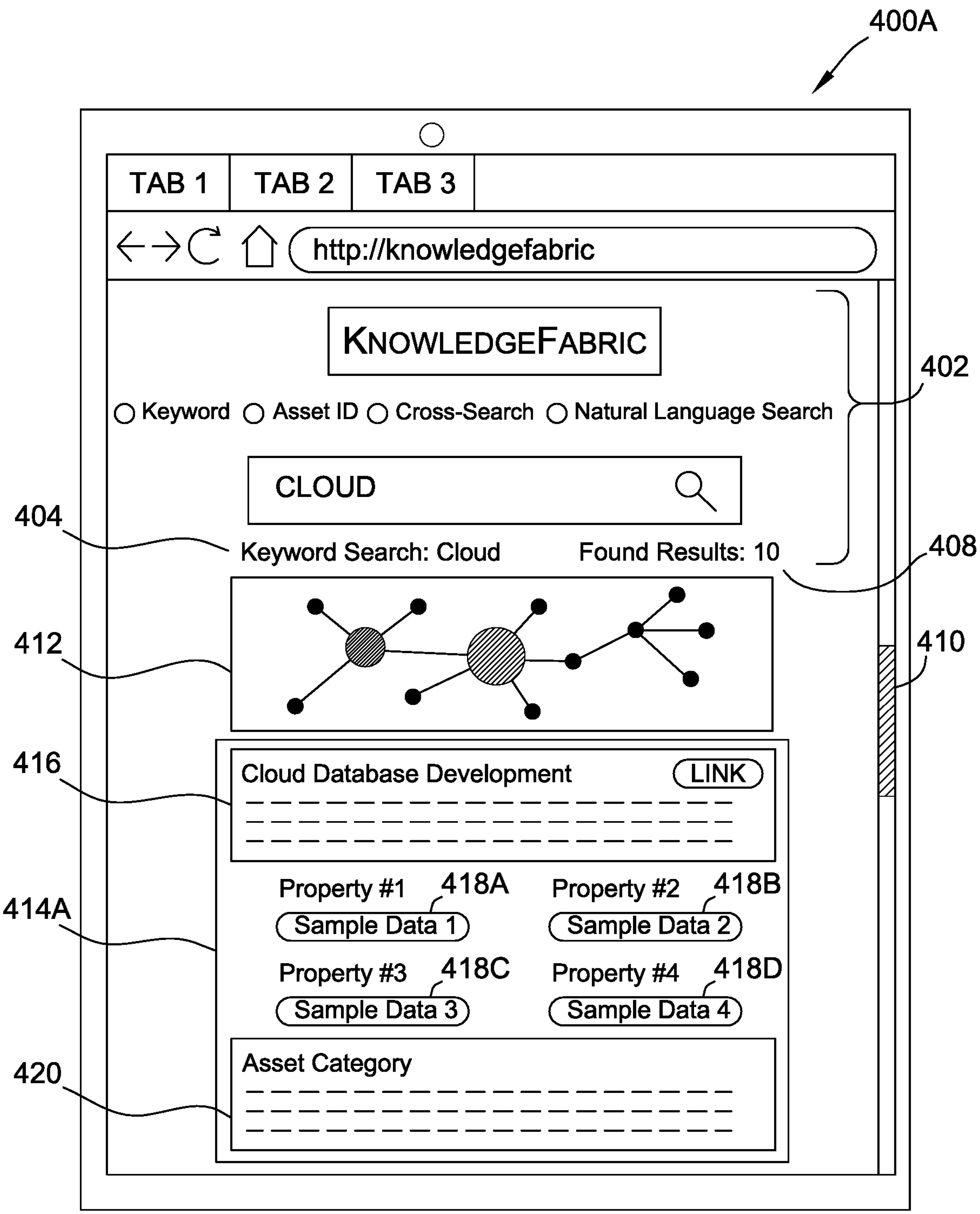
Figure 4B:
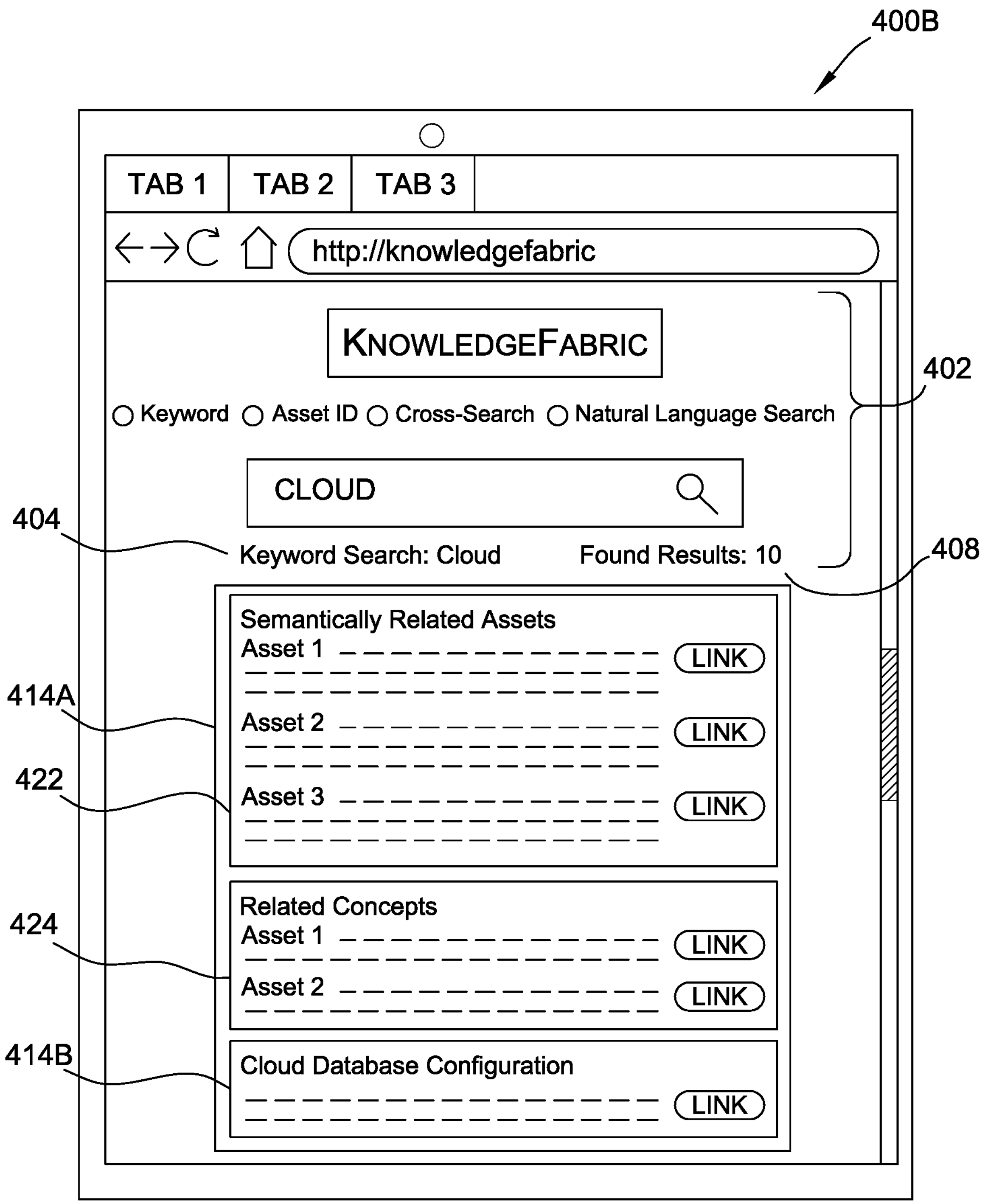

FIGS. 4A-4B depict example views of the UI corresponding to a search query response in accordance with exemplary embodiments of the present disclosure.

Figure 5:
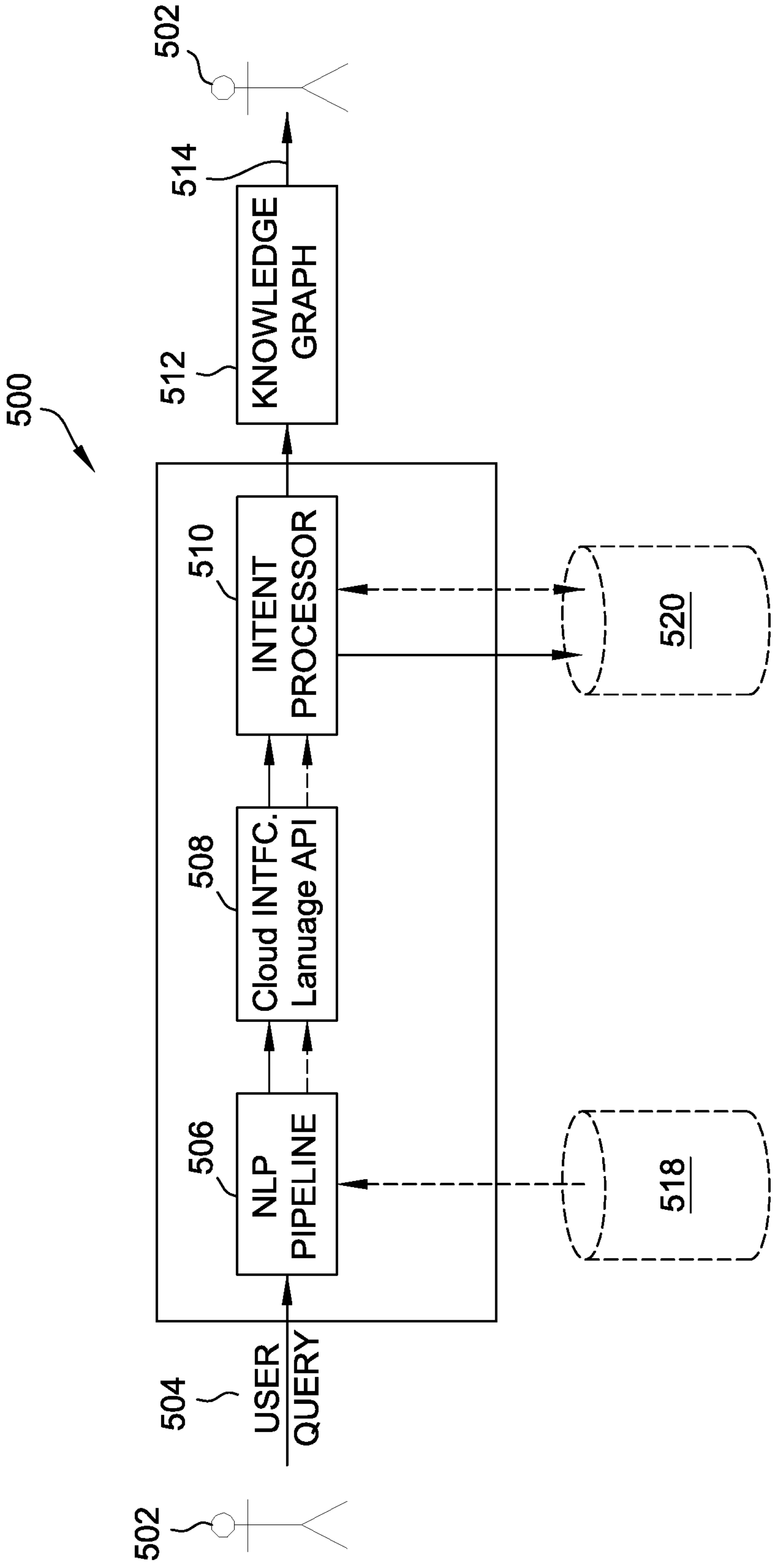

FIG. 5 depicts an example process flow corresponding to natural language searching in accordance with exemplary embodiments of the present disclosure.

Figure 6:
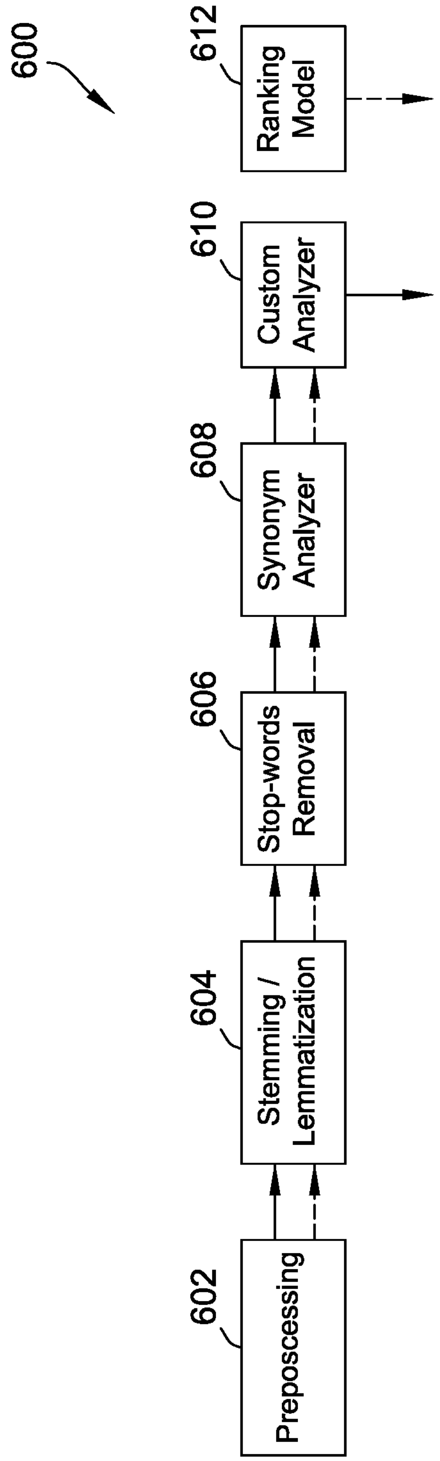

FIG. 6 depicts an example natural language processing pipeline in accordance with exemplary embodiments of the present disclosure.

Figure 7A:
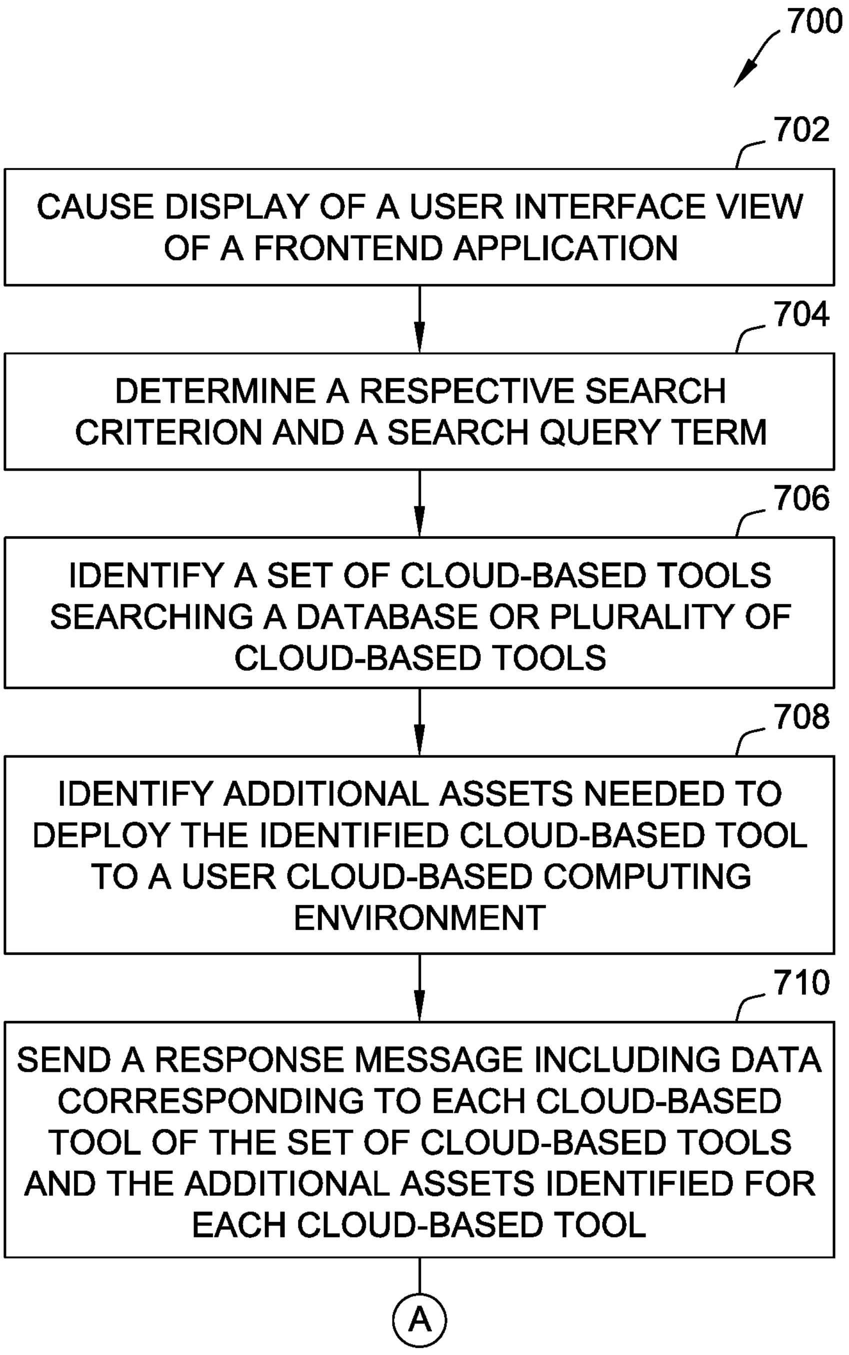
Figure 7B:
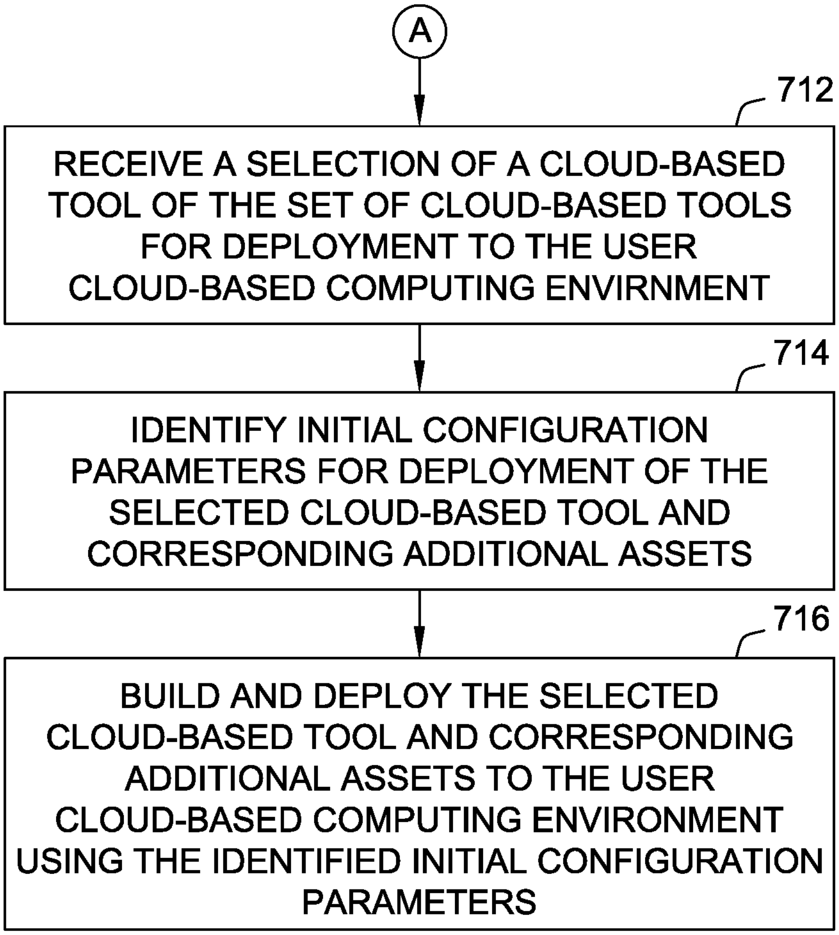

FIG. 7A and FIG. 7B depict an example flow-chart of operations being performed by a backend system (e.g., the knowledge fabric) in accordance with exemplary embodiments of the present disclosure.

Figure 8:
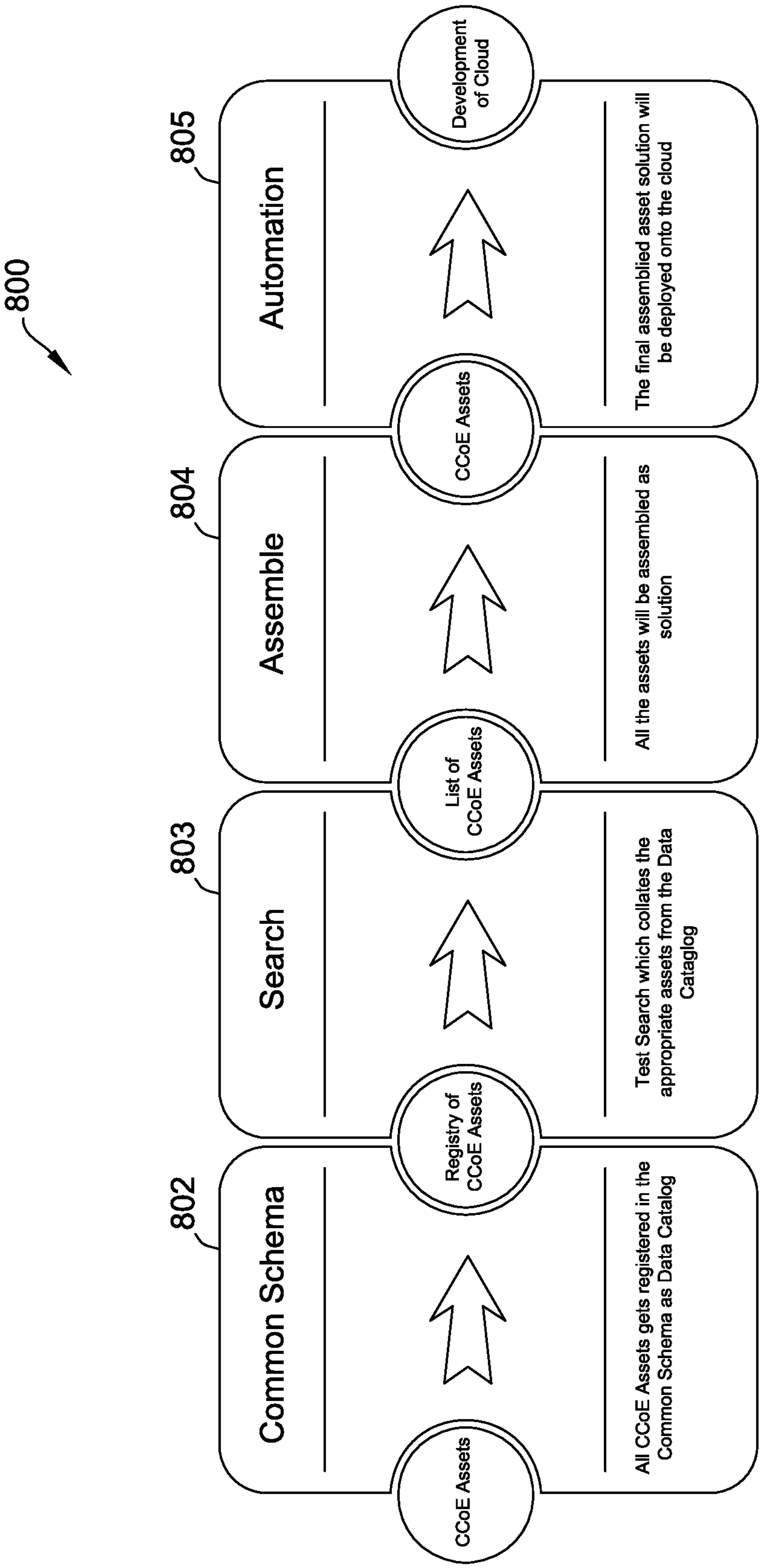

FIG. 8 is an overview of a process flow that may be implemented by a cloud service provider in an exemplary embodiment of the present disclosure.

Figure 9:
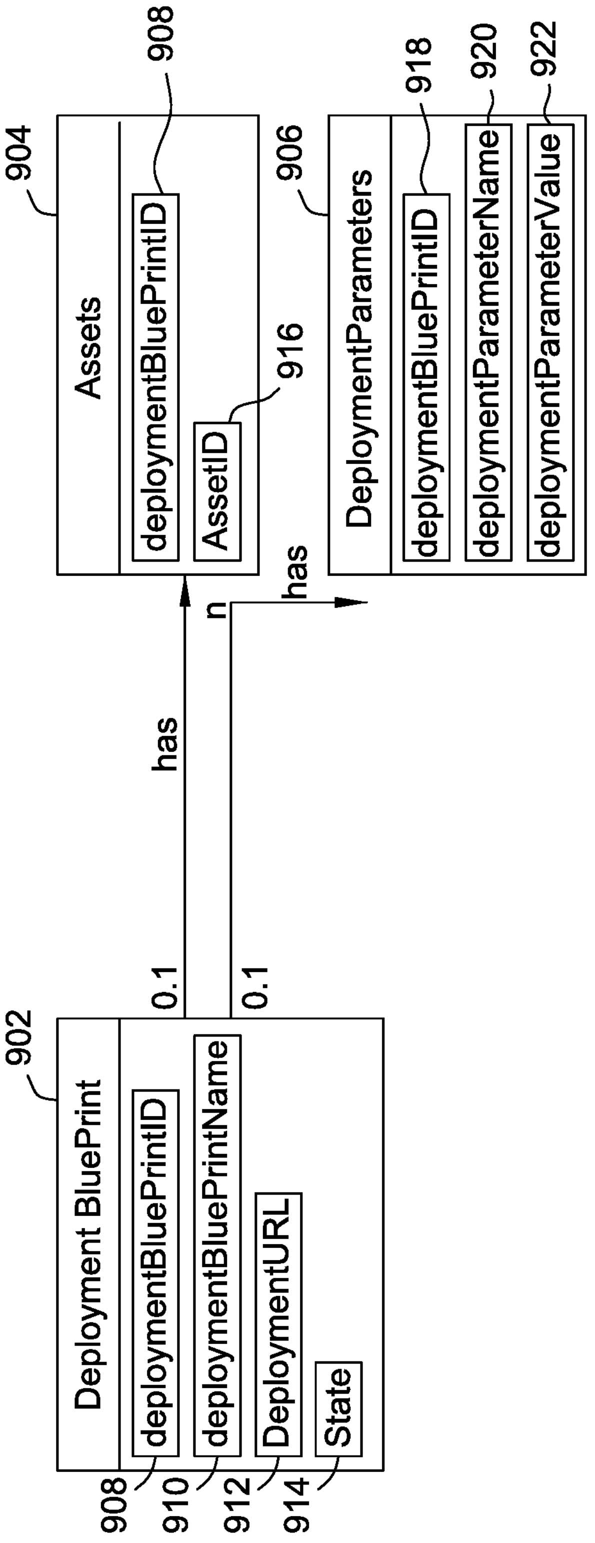

FIG. 9 is a deployment diagram illustrating an exemplary embodiment of a deployment blueprint model used by a cloud service provider in accordance with the present disclosure.

Figure 10:
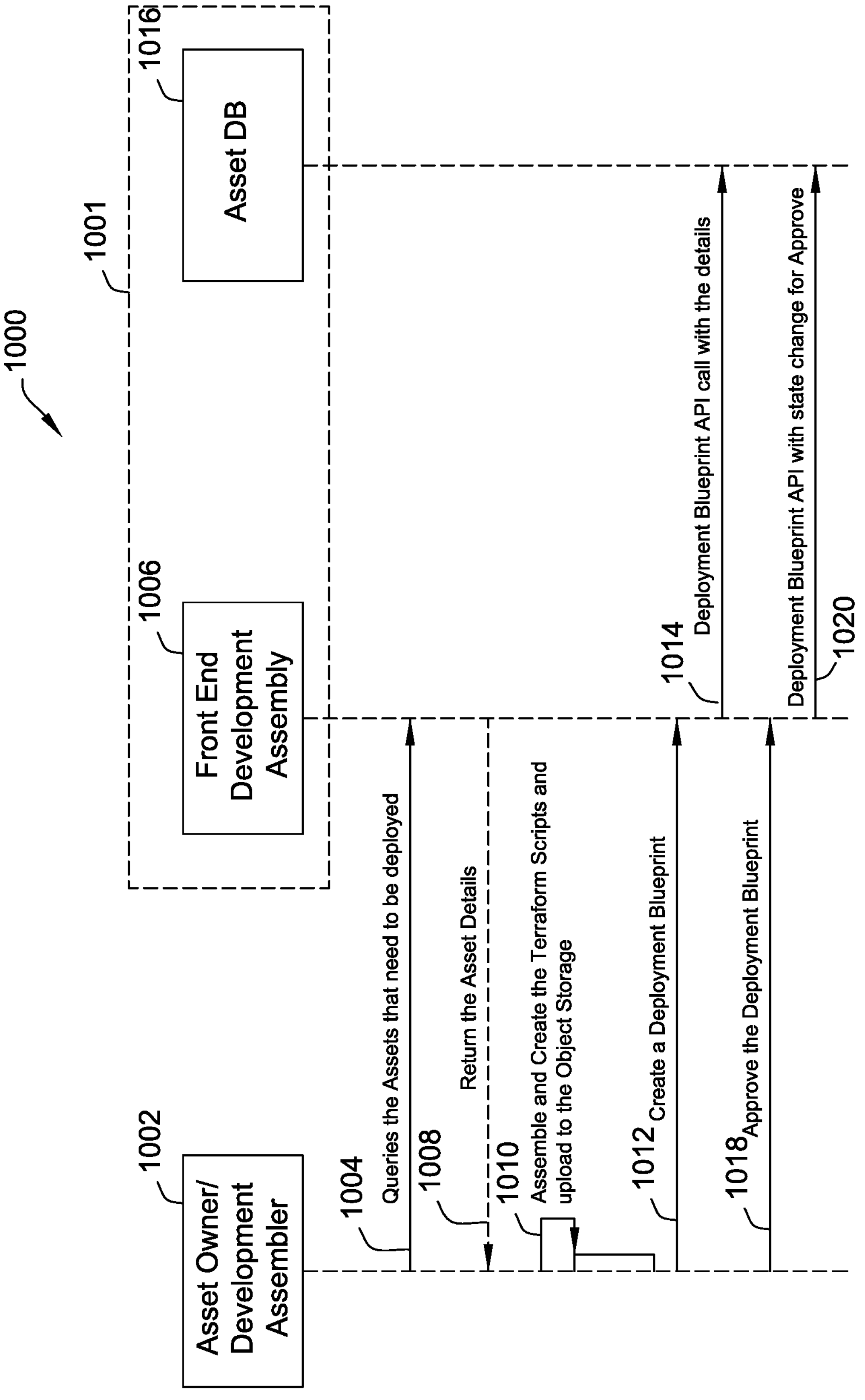

FIG. 10 is a message flow diagram of a deployment assembler process in an exemplary embodiment of the present disclosure.

Figure 11:
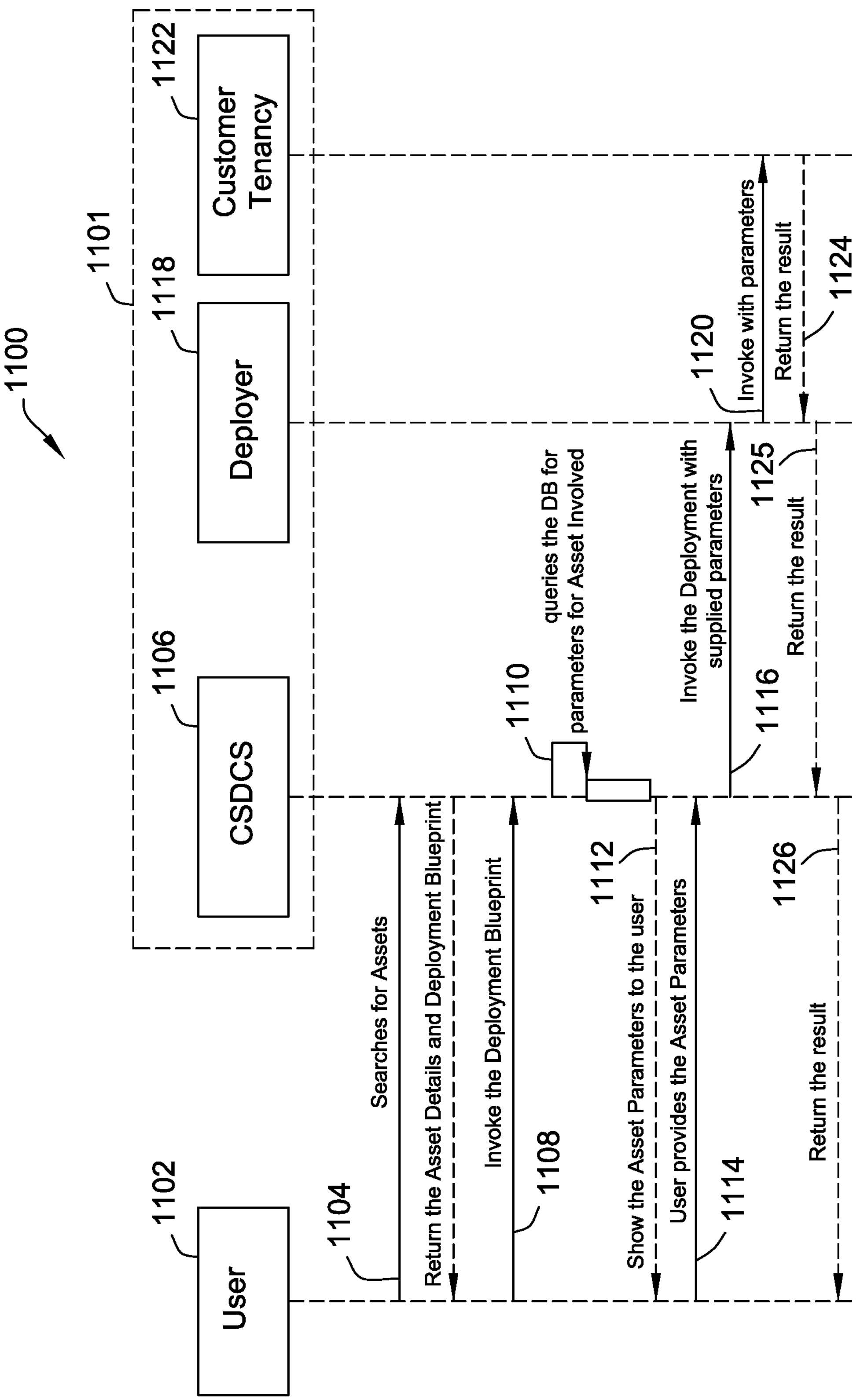

FIG. 11 is a message flow diagram of a deployment process in an exemplary embodiment of the present disclosure.

Figure 12:
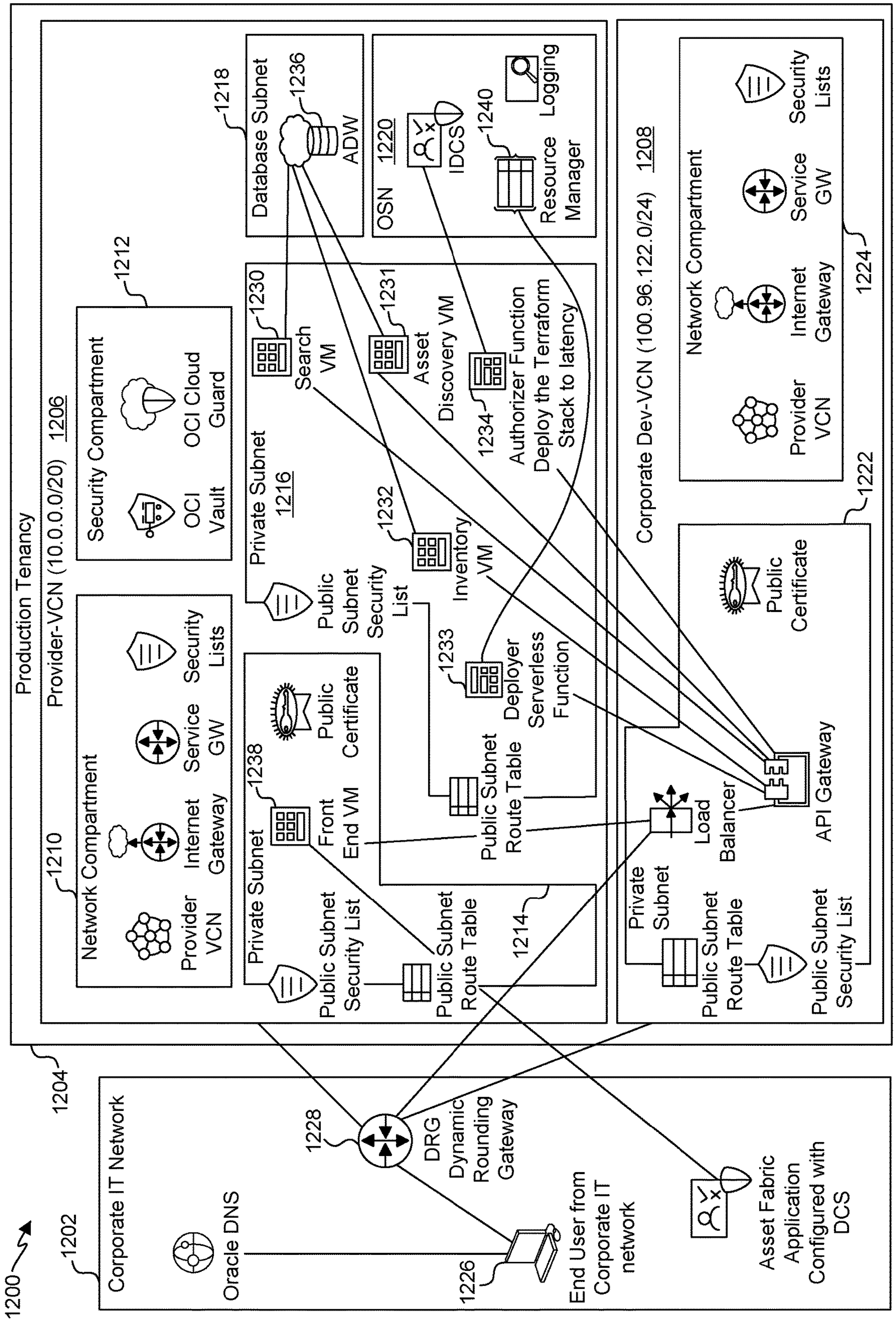

FIG. 12 depicts a cloud architecture in an exemplary embodiment of the present disclosure.

Figure 13:
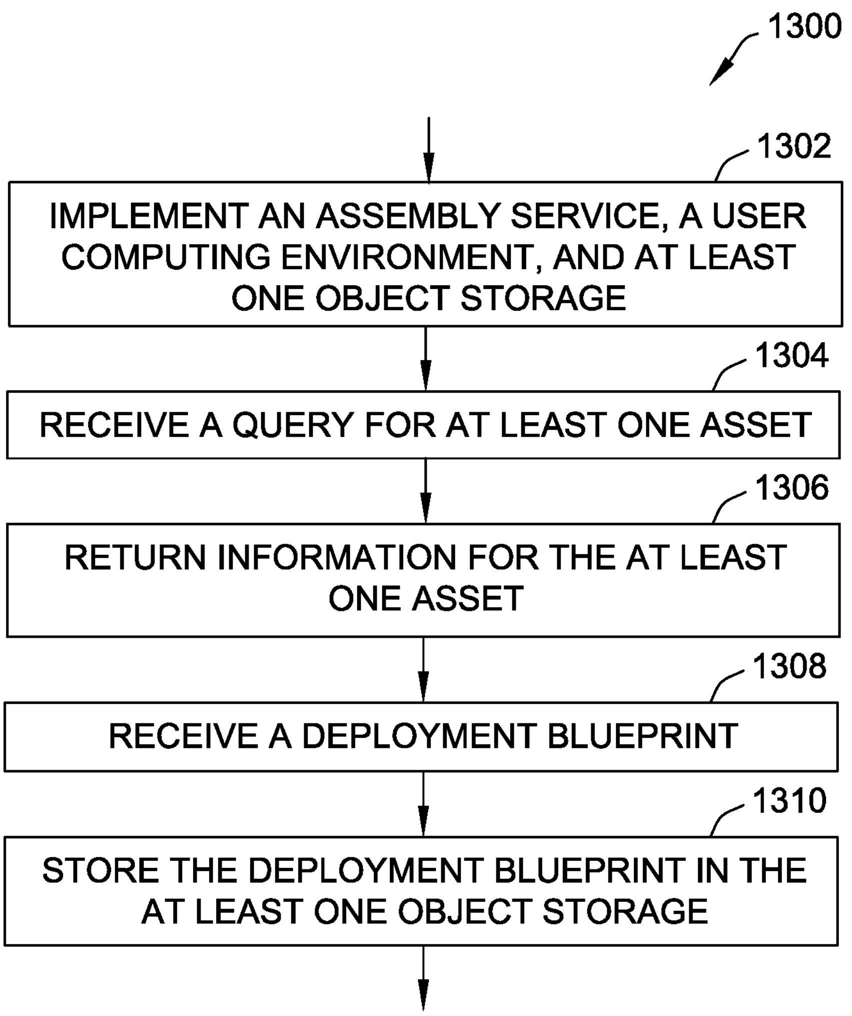

FIG. 13 is a flow chart of a computer-implemented method in an exemplary embodiment.

Figure 14:
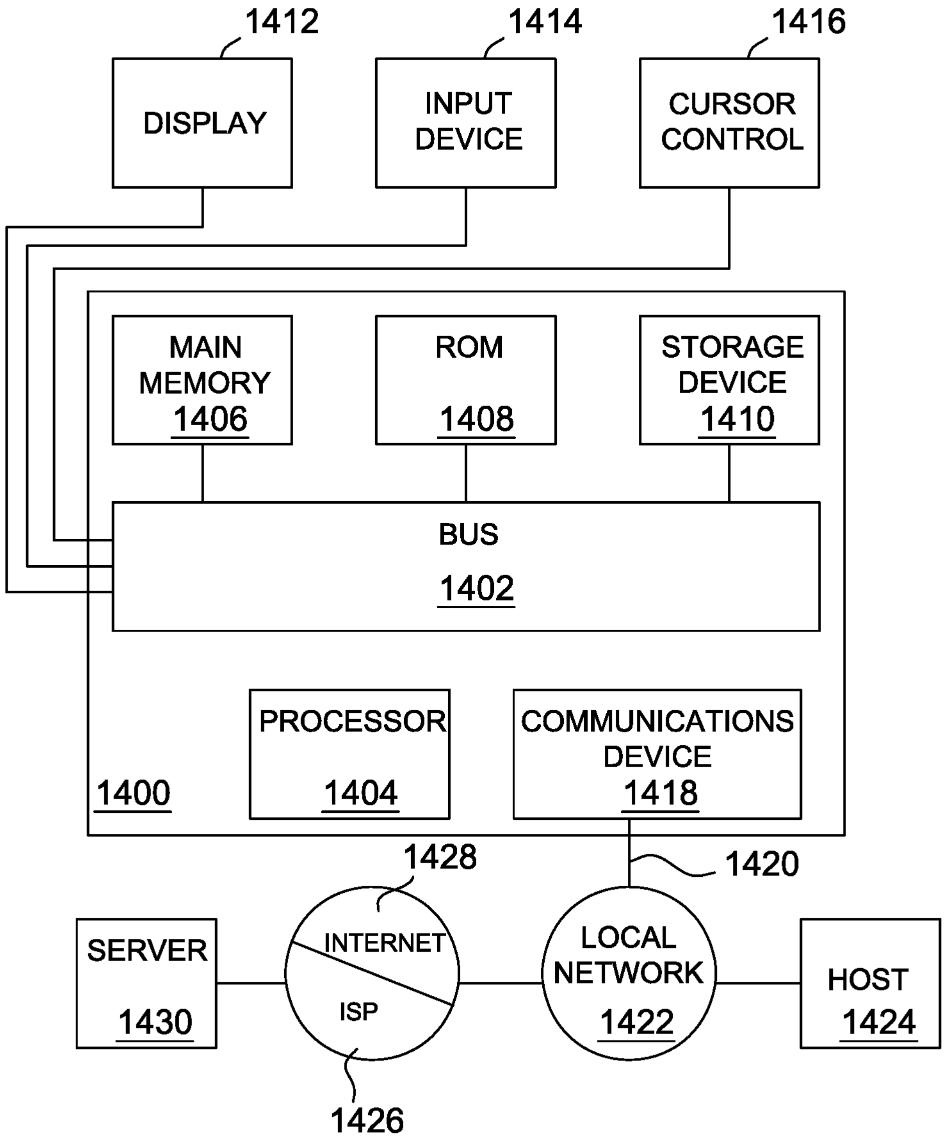

FIG. 14 depicts an example block diagram of a computer system configured to implement various embodiments of the present disclosure.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general-purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

Many organizations are moving towards cloud-based computing systems or cloud-based hosting environments so that the organization can benefit from more resources or assets being available for their use as compared to a local computing system or local hosting environment. While a cloud-based computing system offers the benefits of a large pool of assets being available to a user, it may be difficult for the user to identify which asset would be more appropriate for the user for a particular application or a particular use. Accordingly, it may take a substantial amount of time for the user to search and deploy an asset for the particular application or use. Further, after a user has found a correct asset for deployment, in some cases, the user may have to familiarize themselves with the asset specific user interface to deploy the asset to the user's computing environment.

Various embodiments/aspects described in the present disclosure provide solutions to the above-mentioned technical issues associated with the current cloud-based systems.

In some embodiments, a user interface (UI) for common search and data catalog services (CSDCS), as described in the present disclosure, may act as a frontend application to a backend system providing CSDCS. The CSDCS may provide one or more services for a user to add, register, review, modify, remove, delete, search, deploy, and/or provide feedback for, an asset that belongs to an organization's pool of cloud-based assets. In some embodiments, an asset status may also be updated by the user. For example, the user can update the asset status as (i) a public status giving all users access to the asset, (ii) a private status giving only the user who added the asset access to the asset, (iii) a custom status giving a set of selected users access to the asset, and (iv) so on.

In some embodiments, an asset may be a document, a blog, a white paper, a software or an executable code, a proof of concept for a deployable framework or a deployable platform, and so on. The asset may be a static asset or a dynamic asset. A static asset may include a document, a white paper, and/or a blog, and so on. A dynamic asset may include a software or an executable code, and/or a proof of concept for a deployable framework or a deployable platform. In some embodiments, an asset may be an artificial intelligence (AI) or a machine-learning (ML) asset including a ML pipeline.

In some embodiments, the CSDCS may also provide a search service for the user to search for one or more most relevant assets for the user. The search service may enable the user to search an asset catalog listing a plurality of assets using a search query. The search query may be based on a keyword, an asset identification (ID), or natural language text, and so on. One or more AI or ML algorithms may be used to determine a user's intent and determine or identify the most relevant assets for the user, as described in detail in the present disclosure. The user's prior search history and/or the user's profile identifying the user's role in the organization and/or permissions granted to the user corresponding to various assets of the asset catalog may be used to determine the most relevant assets for the user.

In some embodiments, the CSDCS may provide a deployment service for the user to deploy an asset found in a search result corresponding to a user's search query. The asset may be deployed in the user's computing environment. If the asset has dependency on one or more other assets, those assets may also be automatically deployed in the user's computing environment.

In some embodiments, a service may generate a unified assets knowledge graph, which may identify relationships between various assets based on metadata of these assets and classify or group the assets based on the identified relationships. Further, a relationship between the assets may be ranked based on weights assigned to each asset. Different weight values may be assigned to each asset based on proximity of keywords in the asset and/or according to a PageRank algorithm in which assets may be assigned different weights based on their types. An ontology corresponding to an asset may be displayed on a UI, when a user hovers a cursor over an asset shown in the unified assets knowledge graph.

Accordingly, various embodiments/aspects described in the present disclosure provide a user interface for a user to search an asset that is most relevant to the user, to view the asset's relationship with respect to other assets, and to deploy the asset automatically in the user's computing environment. Accordingly, various embodiments/aspects, as described herein, may improve on a computing system (or a cloud-based computing system) by providing a search process configured to find the most relevant assets for a user that is more efficient and more accurate, while giving the user a better understanding of how each asset is classified, grouped, and/or related to other assets.

Figure 1:
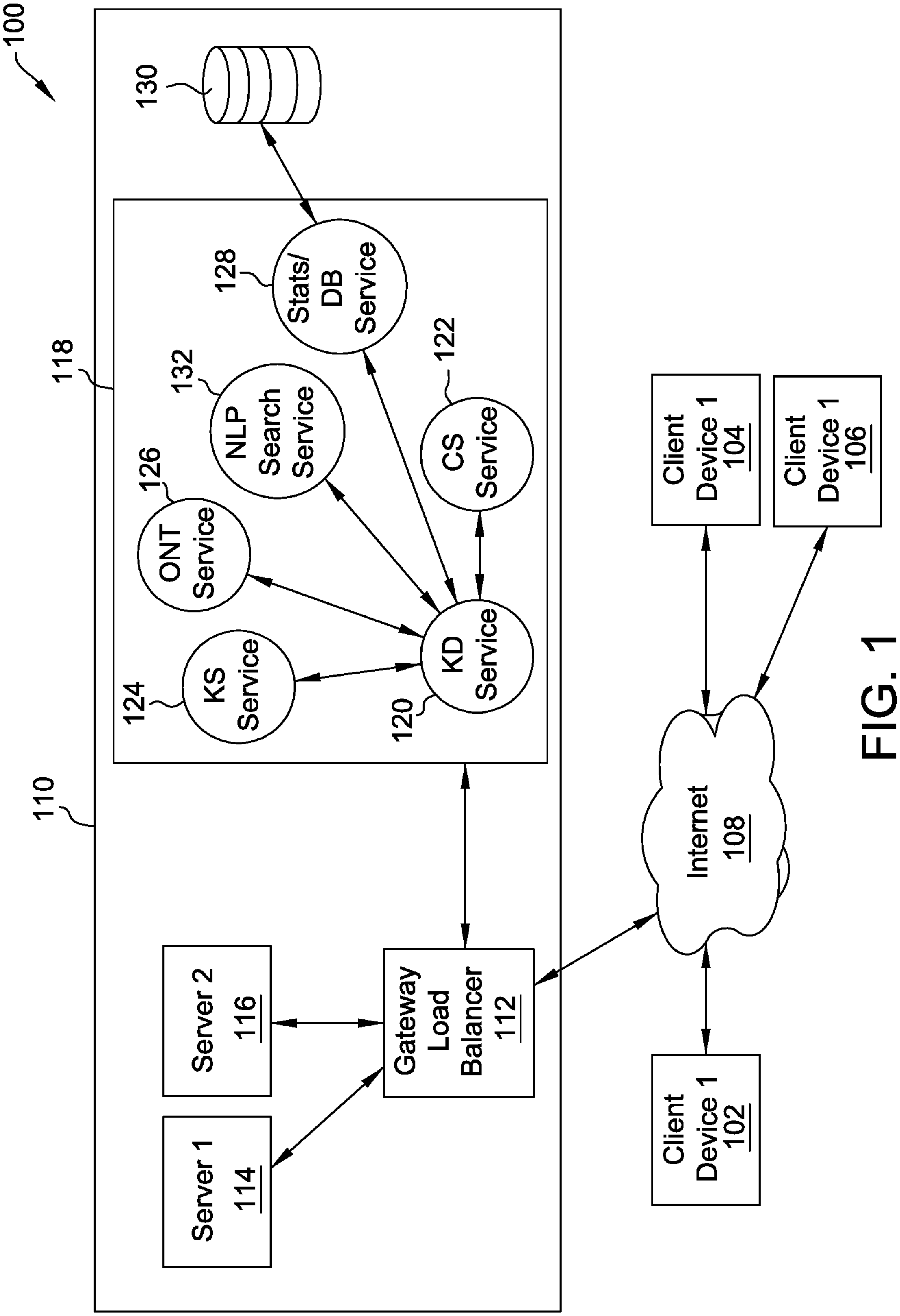
FIG. 1 depicts a block diagram of a knowledge fabric in accordance with exemplary embodiments of the present disclosure.

FIG. 1 is a block diagram of a knowledge fabric 100 in accordance with exemplary embodiments of the present disclosure. The knowledge fabric 100 may be a backend system providing various services to a user via a user interface (UI) of a frontend application executing on a client device. As shown in FIG. 1, a plurality of client devices 102, 104, 106 may communicate with cloud computing resources 110 via Internet 108. Even though, only three client devices are shown in FIG. 1, any number of client devices may communicate with the cloud computing resources 110 via the Internet 108.

By way of a non-limiting example, a client device may be a computer, a tablet, or a smartphone, and so on. The client device may communicate with the cloud computing resources 110 using a local area network, a wide area network, a satellite network, a 3G network, a long-term evolution (LTE) network, a 5G network, and/or a 6G network, and so on.

A frontend application executing on a client device may communicate with the cloud computing resources 110 via a webservice message over a hypertext transfer protocol (http) or a hypertext transfer protocol secure (https) protocol. The webservice message from the frontend application executing on the client device may, for example, be according to a Representational State Transfer (REST) application programming interface (API) and/or a Simple Object Access Protocol (SOAP) API. Further, data may be exchanged between a client device and the cloud computing resources 110 as (i) an extended markup language (XML), (ii) a JavaScript Object Notation (JSON), (iii) a Concise Binary Object Representation (CBOR), (iv) hypertext markup language (html), (v) a binary JSON (BSON), (vi) protocol buffers, and (vii) so on.

The cloud computing resources 110 may include a gateway/load balancer 112 which may form edge computing resources. The gateway/load balancer 112 may provide an interface between the Internet and the cloud computing resources 110. During operation, a webservice message received from a client device may be received by the gateway/load balancer 112. The gateway/load balancer may forward the received webservice message to one of servers server1 114, server2 116, and server3 118 based on current load and available computing resources, e.g., available CPU and/or memory resources, corresponding to each of the server1 114, the server2 116, and the server3 118. Even though, only three servers are shown in the cloud computing resources 110, the cloud computing resources 110 may include any number of servers.

By way of a non-limiting example, one or more servers in the cloud computing resources 110 may be a physical hardware and/or an instance of a virtual machine. Further, one or more servers in the cloud computing resources 110 may be a standby server for one or more active servers in the cloud computing resources 110. Each server in the cloud computing resources 110 may provide the same or different services through one or more applications, e.g., backend applications, executing on each server.

By way of a non-limiting example, a backend application may be a monolithic application, and/or one or more microservices executing on a server in the cloud computing resources 110. A plurality of microservices executing on the server3 118 is shown in FIG. 1. The plurality of microservices may include (i) a knowledge discovery microservice 120, (ii) a keyword-based search microservice 124, (iii) a cross-search microservice 122, (iv) a natural language processing (NLP) search microservice 132, (v) an ontology microservice 126, and/or (vi) a statistics microservice 128, and (vii) so on. One or more instances of a microservice may execute on a server in the cloud computing resources 110. In some examples, the cloud computing resources 110 may include a database 130, and various microservices may access the database 130 directly and/or via a database microservice (not shown in FIG. 1).

In some embodiments, and by way of a non-limiting example, the knowledge discovery microservice 120 may provide an asset discovery functionality according to a search query as received in a message, e.g., a webservice API message, from a frontend application executing on a client device. Based on the type of the received search query, the knowledge discovery microservice 120 may invoke services from other microservices.

For example, if the search query includes a keyword to identify assets based on the keyword, then the knowledge discovery microservice 120 may invoke the keyword-based search microservice 124. The keyword-based search microservice 124 may access assets stored in the database 130 and find the most relevant assets using a term-frequency-inverse document frequency (TF-IDF) algorithm. Further, the most relevant assets being discovered using the TF-IDF algorithm may be ranked using an algorithm, e.g., a cosine similarity ranking algorithm. In some examples, the assets may be ranked based on additional criteria such as popularity of the asset, statistical information corresponding to the asset. The statistical information corresponding to the asset may include, but not limited to, a number of times the asset is viewed by users, the most recent update and/or release date of the asset, and so on. The ranked assets which meet a particular criterion, e.g., a ranking score above 70%, may then be displayed on the UI of the frontend application. Further, ontology of the assets, e.g., the ranked assets, may be generated and displayed on the UI of the frontend application.

In some exemplary embodiments, the search query may include a search term (or a phrase) to identify one or more assets related to the search term, and the knowledge discovery microservice 120 may invoke the cross-search microservice 122 in response to the received search query. In some examples, the search term or the phrase may be an asset ID. In some exemplary embodiments, the search query may include a natural language text, e.g., a free form text, or an unstructured text, and the knowledge discovery microservice 120 may invoke the NLP search microservice 132 in response to the received search query.

In some exemplary embodiments, and by way of a non-limiting example, the knowledge discovery microservice 120 may provide ontology corresponding to assets associated with a particular keyword, a particular search term (or phrase) such as an asset ID, and/or a natural language text. The knowledge discovery microservice 120 may invoke one of the keyword-based search microservice 124, the cross-search microservice 122, the NLP search microservice 132, which may further invoke the ontology microservice 126.

The ontology microservice 126 may identify relationships of an asset with other assets. In some embodiments, and by way of an example, the relationships of an asset with other assets may be determined up to a predetermined number of relationship layers. As an example, when the predetermined number of relationship layers is 3, a first set of assets, that are directly related to the asset, and therefore, in a first layer relationship with the asset according to the search query may be determined. Next, a second set of assets including assets that are directly related to each asset in the first set of assets and that match criteria corresponding to the search query may be determined. Next, a third set of assets including assets that are directly related to each asset in the second set of assets and that match criteria corresponding to the search query may be determined. All the assets from the first set of assets, the second set of assets, and the third set of assets, and the asset corresponding to a search query from a user may then be displayed on a UI of a client device. Details of relationships of each asset with other assets (as applicable) may be included as part of metadata of each asset and/or as properties of each asset. The ontology corresponding to an asset identified based on a search query may be displayed as a graph or in a graphical representation.

The ontology microservice 126 may determine logical relationships between various assets. The logical relationships between various assets may be determined based on proximity of keywords within the asset, and/or based on an asset category.

In some exemplary embodiments, upon determining an asset being an AI asset or a ML asset, the ontology microservice 126 may display a dynamic acrylic graph (DAG) to display how the particular asset was trained and/or how the AI maturity was achieved by the AI asset or the ML asset.

In some exemplary embodiments, the ontology microservice 126 may generate a knowledge graph according to a particular domain specific language. For example, the ontology microservice 126 may generate knowledge graphs specific to (i) a financial industry business ontology (FIBO), (ii) a cloud data management capabilities framework, (iii) a data management capabilities assessment model, and (iv) so on, based on the asset being related to, or applicable to, the financial industry, the cloud computing system, the data management system, and so on, respectively.

In some exemplary embodiments, and by way of a non-limiting example, the knowledge discovery microservice 120 may provide statistics associated with a particular keyword, a particular search term (or phrase) such as an asset ID, and/or a natural language text. The knowledge discovery microservice 120 may invoke one of the keyword-based search microservice 124, the cross-search microservice 122, the NLP search microservice 132, which may further invoke the statistics microservice 128. The statistics microservice may provide statistical information corresponding to an asset as identified based on the search query. The statistical information may include, but not limited to, information such as (i) a publication date of an asset, (ii) a number of times an asset is searched, (iii) a number of times an asset is viewed, (iv) a number of users who have accessed and/or edited an asset, (v) a number of times an asset is deployed (if applicable), (vi) a number of times a user feedback is received for an asset, and/or (vii) a number of other assets that is related to an asset, and (viii) so on.

In some exemplary embodiments, and by way of a non-limiting example, the database 130 may be a cloud database. The cloud database may be a rational database, a NoSQL database, a multi-model database, and/or a distributed SQL database, and so on. The database may store content such as assets, metadata and/or properties of each asset, user information (e.g., a user profile, user's search history, and so on) for a plurality of users, one or more keywords or tags associated each asset, statistics corresponding to each asset, and so on. Assets may include one or more static assets, dynamic assets, and/or AI/ML assets.

In the following, various use cases of the knowledge fabric 100 are described using example view of a user interface (UI) of a frontend application executing on a client device. As stated herein, the frontend application is in communication with the knowledge fabric 100.

Figure 2:
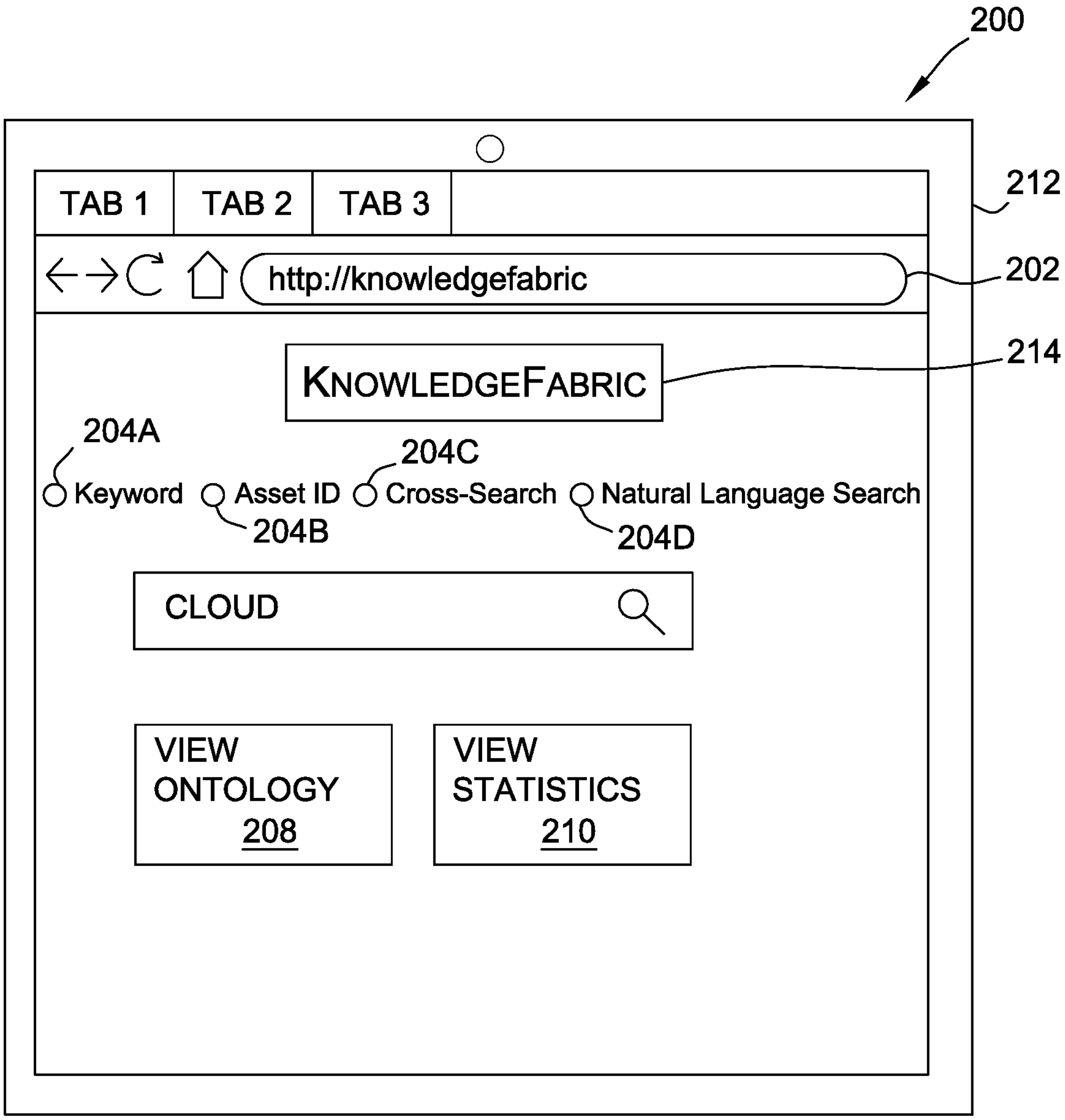
FIG. 2 depicts an example view of a user interface (UI) of a frontend application executing on a client device in accordance with exemplary embodiments of the present disclosure.

FIG. 2 displays an example screenshot or an interface view 200 of a UI of a frontend application executing on a client device. The frontend application may be a web browser-based application, a mobile application, or a native application. The interface view 200 of the UI displayed on a display 212 of a client device corresponds with a web browser-based frontend application executing on the client device. A user of the client device may access the knowledge fabric 100 and its services by entering a particular uniform resource locator (URL) address of the knowledge fabric that is a backend system in a URL locator address bar 202 shown on interface view 200.

Upon successful communication, or establishment of a session, between the frontend application and the knowledge fabric, as shown in the interface view 200, the user is displayed a page showing, for example, a page header 214 and a plurality of radio buttons to select a particular search selection criterion. For example, as shown in the interface view 200, a radio button 204*a* when selected by the user, a search operation may be performed based on a particular keyword or a phrase entered by the user in an input text box 206 when the user either hits an enter key or clicks on a magnifying lens icon in the input text box 206. The user may also generate a knowledge graph and/or ontology corresponding to text entered into the input text box 206 by clicking on a view ontology option labeled as 208, as shown in the interface view 200. The user may generate statistics corresponding to text entered into the input text box 206 by clicking on a view statistics option labels as 210, as shown in the interface view 200.

In some examples, the user may know an asset ID value for an asset, and the user may search for the known asset ID by selecting a radio button 204*b* and entering the asset ID value in the input text box 206 shown in the interface view 200. To search (other) assets that are related to the asset ID value known to the user, the user may select a radio button 204*c* and enter an asset ID value in the input text box 206. Additionally, or alternatively, the user may search for assets by selecting a radio button 204*d* and entering natural language text or a free-form language in the input text box 206 shown in the interface view 200.

The particular search criterion selected by the user corresponding to a radio button, e.g., the radio button 204*a*, 204*b*, 204*c*, or 204*d*, and associated search query term entered in the input text box 206 are communicated to the knowledge fabric 100 in an API message, e.g., a REST API message. The knowledge fabric may perform a query for the received search query term according to the received search criterion.

In some examples, after the user selects the magnifying lens shown in the input text box 206, an additional UI window may be displayed. The additional UI window may be shown as an overlay over the existing UI view. Each of FIG. 3A, FIG. 3B, and FIG. 3C shows an example interface view of an additional UI window displayed as an overlay over the interface view 200.

As shown in interface views 300*a*, 300*b*, and 300*c* corresponding to FIG. 3A, FIG. 3B, and FIG. 3C, a display box 302 may display the search criterion selected by the user, and the user's input for confirming before building and sending an API message to the knowledge fabric 100 from the client device. The search criterion may be selected by the user by selecting one of the radio buttons 204*a*-204*d*, and the user's input may be provided in the input text box 206, as shown in the interface view 200. The user may provide confirmation by selecting or clicking a text display box labeled 304 in the interface views 300*a*, 300*b*, and/or 300*c*, an API message may be built at the client device and sent to the knowledge fabric 100 for performing the requested search operation. Additionally, or alternatively, the interface views 300*a*, 300*b*, and/or 300*c* may also be removed from being displayed. As shown in the interface views 300*a*, 300*b*, and 300*c*, the text display box 304 may display "submit," "retrieve," or "search," or any other text that solicits the user's input to proceed to build and send an API message to the knowledge fabric 100.

Upon receiving a search query response from the knowledge fabric 100, a page displaying one or more assets with their corresponding information may be displayed in the UI. The page displaying one or more assets with their corresponding information may be displayed in a new tab, or as an overlay over the currently displayed interface view. In some examples, each asset of the one or more assets with their corresponding information may be displayed as a selectable hyperlink. When the user brings a cursor in proximity of the selectable hyperlink, an overlay window showing information associated with the asset may be displayed. When the user selects the selectable hyperlink, a new tab in the current web browser session, or a new web browser window, may be opened for displaying details about the asset and its corresponding statistics.

In some exemplary embodiments, and by way of a non-limiting example, details about the asset may include (i) description of the asset, (ii) a set of keywords associated with the asset, (iii) a set of services or applications in which the asset may be used, (iv) relevant dates (e.g., asset release date, date of last update), (v) a list of industry in which the asset is used, and/or (vi) a list of stakeholders/audience, e.g., data analysts, data scientists, programmers, and (vii) so on. In some examples, the user may initiate deployment of the asset and/or other assets required for successful deployment of the asset in the user's computing environment. Details about the asset may also include statistics details such as a number of times other users have viewed this page, and so on. In some examples, the user may also provide feedback and/or suggest edits/corrections regarding the asset through the interface view.

In some embodiments, the search query response may be displayed as shown in an interface view 400*a* and an interface view 400*b* of FIG. 4A and FIG. 4B, respectively. As shown in the interface view 400*a*, a section marked 402 may display radio buttons to select a search query criterion, as discussed herein, and an input text box showing user entered search input. A query response, as received from the knowledge fabric 100, may be displayed as shown in the interface view 400*a*.

In some examples, statistical information, such as a total number of results found corresponding to the user's search query term, as shown in the interface view 400*a* as 406, and for the user selected search criterion, as shown in the interface view 400*a* as 404, may be displayed (e.g., as shown in the interface view 400*a* as 408). Ontology or a knowledge graph 412 showing relationship between different search result items (or assets), and their relationships with other items may also be displayed. The search result items may include a static asset, a dynamic asset, and/or an AI/ML asset. The other items may be static assets, dynamic assets, and/or AI/ML assets, as described in the search result item, and/or related to the search result item. Accordingly, the ontology or the knowledge graph 412 may provide a pictorial view of all the assets and their relationships for the user's search query term.

A first search result item from the search result items may be shown as 414*a*. By way of a non-limiting example, the first search result item may be a static asset, which is shown in the interface view 400*a* as 416. Description corresponding to the first search result item and a selectable hyperlink may be displayed in the interface view 400*a* as labeled as 416. The description may be extracted by analyzing the first search result item, and/or the description may be based on metadata and/or properties of the first search result item. One or more properties of the first search result item may also be displayed in the interface view 400*a* as 418*a*-418*d*. An asset category to which the first search result item belongs to, and its description may be shown in the interface view as labeled as 420.

Using a scrollbar 410, the user may scroll up and/or down. As the user scrolls down using the scrollbar 410, one or more other (semantically) related assets may be shown as shown in the interface view 400*b* as 422. In some examples, other related concepts including, but not limited to, relevant keywords, relevant questions, relevant statistics, relevant assets, and so on, may also be shown as labeled in the interface view 400*b* as 424. A second search result item 414*b* may be similarly shown like the first search result item 414*a* is shown.

In FIGS. 1, 2, 3A-3C, and 4A-4B, an example embodiment of the knowledge fabric 100, both from the backend and the frontend perspectives, is described in detail with respect to the keyword-based search criterion. Further, as described herein, instead of a keyword, the user can enter a question as he/she will ask to another human being and select "natural language search" as a search criterion. FIG. 5 describes an example flow for processing the user's query in a free language form (or a natural language form), for example, by the natural language processing search micro-service 132.

As shown in a process flow diagram 500, upon receiving a user query 504 in a natural language form from a user 502, the user query may be processed through a natural language processing (NLP) pipeline 506, which is described in the present disclosure using FIG. 6. The NLP pipeline 506 may access asset data stored in a database 518. By way of a non-limiting example, the database 518 may be the same as the database 130. The NLP pipeline 506, which is shown in FIG. 6 as 600, may transform free form text entered by the user into a clean and consistent format during preprocessing 602. The preprocessed text then may be processed through stemming and/or lemmatization process during 604. After performing stemming and/or lemmatization, a stop-words removal 606 and synonym analyzer 608 processes may be performed. Thus, the present system is configured to perform preprocessing 602, stemming and/or lemmatization process 604, stop-words removal 606, and/or synonym analyzer 608 all associated with natural language processing.

In some embodiments, a custom analyzer 610 process may also be performed. The custom analyzer, for example, may be a lookup table that lists words that are not synonyms, but users may have used them interchangeably. Accordingly, an output of the custom analyzer 610 may be a list of one or more keywords to perform searching of assets.

In some embodiments, relevant assets corresponding to the list of one or more keywords may be identified using a term-frequency-inverse document frequency algorithm. Subsequently, a ranking model 612 process may be performed to rank the relevant assets based on their relevancy with the received user query. By way of a non-limiting example, the ranking model may determine a respective ranking score of each relevant asset using an algorithm, e.g., a cosine similarity ranking algorithm.

Based on the respective ranking score assigned to each asset, assets that meet particular selection criteria may be identified for displaying on an interface view on a client device. By way of a non-limiting example, the selection criteria may include, but not limited to, assets having a particular relevancy score, e.g., 70%, assets that are added and/or reviewed by other users in the same user group, and so on.

Returning back to FIG. 5, relevant assets that meets the selection criteria may then be processed through a language API service 508. By way of a non-limiting example, the language API service (or a cloud interface language API service) may perform translation of assets that are not in a user's preferred language. The user's preferred language may be determined based on the user profile or based on a language in which the user entered free form text for performing natural language search. If any of the relevant assets is in a language different from the user's preferred language, then using the language API service 508, all relevant assets may be converted into the user's preferred language.

The assets translated in the user's preferred language may be further processed through an intent processor 510. The intent processor 510 may invoke an API to a service 520 to further identify or filter the assets that match the user's intent behind the natural language search. By way of a non-limiting example, the user's intent may be determined based on the user's entered search text input, the user's profile, the user's previous search history, and so on. A knowledge graph 512 corresponding to the assets that match the user's intent may then be generated by identifying other related, dependent and/or required assets. An API response message then may be built and sent to the user's client device for displaying as shown in FIG. 4A and FIG. 4B as interface views 400*a* and 400*b*, respectively.

In some embodiments, the user's previous search history and/or other frequently searched keywords may also be displayed on an interface view. By way of a non-limiting example, the user's previous search history displayed on the interface view may be preselected and/or configurable. For example, the interface view may display the user's search history for the last 7 days unless the user has changed or reconfigured to a different period, for example, the last 14 days. Similarly, other frequently searched keywords during the day may be displayed. The user may change or reconfigure to display other frequently searched keywords for a different period, such as for the last 3 days, and so on.

FIG. 7A and FIG. 7B depict an example flow-chart 700 of operations being performed by a backend system (e.g., the knowledge fabric) in accordance with exemplary embodiments of the present disclosure. The operations described in the flow-chart 700 may be performed by at least one server executing a backend application (e.g., a monolithic application and/or one or more microservices). The backend application may be communicatively coupled with at least one client device executing a frontend application.

At 702, the backend application may cause display of a user interface of the frontend application on a display of the client device. The user interface view may include a plurality of input controls. The plurality of input controls may include at least first and second input controls. The first input control may include one or more radio buttons. The second input control may include at least one input text box. The first input control and the second input control may be as shown in FIG. 2. Each button of the one or more radio buttons may be configured to provide a user of the client device an affordance to select and/or provide a type of search criterion. The at least one input text box may be configured to receive text input corresponding to a search query term. By way of a non-limiting example, the type of search criterion may include a keyword search, an asset ID search, a cross search, and/or a natural language search.

At 704, in response to a user of the client device selecting a particular button and providing a type of search criterion, and entering text input in the text input box, the frontend application may build and send a message to the backend application. By way of a non-limiting example, the message may be an API message. In response to receiving the message, the backend application may determine the type of search criterion and the search query term from the received message.

At 706, based on the determined type of search criterion and using the search query term, the backend application may search a database to identify a set of cloud-based tools of a plurality of cloud-based tools matching the search query term. The plurality of cloud-based tools may be stored in the database. A cloud-based tool may be an asset stored in the database, and the asset may be a static asset, a dynamic asset, and/or an AI/ML asset, as described herein. In some examples, the backend application may invoke one or more microservices to search the database. The one or more microservices may be invoked based on the type of search criterion, as described herein using FIG. 1.

The search query term may be a single keyword, an asset ID, and/or natural language text. Based on the natural language text, one or more keywords may be identified to search the database, and to identify the set of cloud-based tools matching the one or more keywords used for searching the database. In some examples, the set of cloud-based tools may be identified using a TF-IDF algorithm. Each cloud-based tool of the set of cloud-based tools may have properties associated with the search criterion that match the search query term. In some examples, at least some cloud-based tools (e.g., one or more cloud-based tools) of the set of cloud-based tools may be dynamic assets, which are deployable to a user cloud-based computing environment. In some examples, properties of an asset may be pre-assigned.

At 708, for each identified cloud-based tool, which is a dynamic asset or a deployable asset, one or more additional assets required for successful deployment of the cloud-based tool to the user cloud-based computing environment may be identified. By way of a non-limiting example, one or more additional assets required for successful deployment of the cloud-based tool to the user may be identified based on deployment properties of the cloud-based tool (e.g., a dependency tree), and/or currently deployed cloud-based tools in the user cloud-based computing environment. In some embodiments, if an asset of the one or more additional assets required for successful deployment of a cloud-based tool is deployed in the user cloud-based computing environment, a corresponding status of the asset may also be identified. Alternatively, or additionally, if an asset of the one or more additional assets required for successful deployment of a cloud-based tool is deployed in the user cloud-based computing environment, the asset may be ignored as one of the required assets for successful deployment of the cloud-based tool.

In some embodiments, and by way of a non-limiting example, each cloud-based tool of the set of cloud-based tools may be ranked, and their respective score may be used to determine an order in which each cloud-based tool of the set of cloud-based tools may be displayed on the client device. Additionally, or alternatively, from the set of cloud-based tools, one or more cloud-based tools meeting a particular criterion, or a particular matching threshold may be identified for displaying on the client device. In some examples, each cloud-based tool of the set of cloud-based tools may be ranked using an algorithm, e.g., a cosine similarity algorithm. However, any other criteria or algorithm may also be used for ranking each cloud-based tool of the set of cloud-based tools. The set of cloud-based tools may be determined based on each cloud-based tool's respective ranking score meeting a particular criterion. The particular criterion or the particular matching threshold, for example, may be a ranking score that is at least a particular threshold value (e.g., 60% (0.6) or 70% (0.7)).

The ranking score identifies similarity between two cloud-based tools. Each cloud-based tool of the set of cloud-based tools may be associated with a list of one or more keywords. The list of keywords and their corresponding numerical representation (e.g., according to TF-IDF algorithm) may be used to define similarity of a cloud-based tool with the one or more keywords used for searching the database. Based on the numerical representation of each keyword in the list of keywords, each keyword may be assigned different weight factor (e.g., a positive value that is between 0 and 1, including 0 and 1). A keyword appearing more frequently may be assigned a higher weight factor then another keyword appearing less frequently. Accordingly, based on the weight factor assigned to each keyword of the list of one or more keywords representing a cloud-based tool, and matching the one or more keywords used for searching the database, each cloud-based tool's ranking score may be determined in comparison with an ideal or a perfect cloud-based tool, which has a weight factor of value 1 assigned to each keyword of the one or more keywords used for searching the database. By ranking each cloud-based tool of the set of cloud-based tools, as described herein, the most relevant cloud-based tools may be identified for displaying in an interface view based on the ranking score. A cloud-based tool having a higher-ranking score may be displayed on the top above another cloud-based tool having a lower-ranking score. By including cloud-based tools meeting at least the particular threshold value (e.g., 60% (0.6) or 70% (0.7), only most relevant cloud-based tools may be displayed in the interface view. In other words, a user searching for a solution of a problem or a cloud-based tool providing a particular service or functionality in the user cloud-based computing environment may be displayed the most relevant cloud-based tools based on the user's provided search query term.

At 710, the backend application may generate and send/transmit a response message to the client device. By way of a non-limiting example, the response message may be an API message. The API response message may include data corresponding to each cloud-based tool of the set of cloud-based tools and additional assets (e.g., one or more additional assets) required for successful deployment of each cloud-based tool of the set of cloud-based tool for displaying in another user interface view (or interface view) of the frontend application, for example, interface views 400*a* and/or 400*b* as shown in FIG. 4A and/or FIG. 4B, respectively. Additionally, or alternatively, the data may include how each cloud-based tool is relevant as a solution to the particular problem identified based on the search query term, or a particular service or functionality identified based on the search query term that the user desired for the user cloud-based computing environment. The data may include cost associated with deployment of each cloud-based tool. The cost here represents an amount of time required for deployment and/or any service interruption, and/or a monthly or annual price for deployment of each cloud-based tool.

At 712, the user of the client device may select a particular cloud-based tool from the set of cloud-based tools for deployment in the user cloud-based computing environment. As described herein, when data corresponding to each cloud-based tool of the set of cloud-based tools is displayed in an interface view of the frontend application, the user may select a hyperlink associated with a cloud-based tool. A page displayed in response to the use selecting the hyperlink may indicate if the cloud-based tool is deployable, for example, when the particular cloud-based tool is a dynamic asset. If the user selects a corresponding affordance to deploy the asset, the backend application may receive a message, which may include a user selection of a cloud-based tool for deployment to the user cloud-based computing environment.

As described herein, the user selected cloud-based tool for deployment to the user cloud-based computing environment may depend on one or more additional assets for successful deployment of the cloud-based tool to the user cloud-based computing environment. At 714, initial configuration parameters for deployment of the selected cloud-based tool and the one or more additional assets may be identified. The initial configuration parameters, for example, may be a collection of configuration parameters associated with the selected cloud-based tool for deployment and the one or more additional assets required for successful deployment.

By way of a non-limiting example, a respective value of one or more initial configuration parameters of the configuration parameters may be resolved based on properties of the selected cloud-based tool and the one or more additional assets required for successful deployment. For example, a solution, or a particular service or functionality identified based on the search query term may include deployment of a database asset and a web application asset in the user cloud-based computing environment. Deployment or provisioning of the database asset may require a name of the database as a user input. The name of the database may be used for provisioning a URL to connect to the deployed database asset. Accordingly, an input parameter of the web application asset may include the URL of the database. So, the initial configuration parameters may include a database name and a URL name. However, the URL name is resolved or associated with the database name. The database name, which is an unresolved initial configuration parameter, may be resolved based on user input.

Based on the initial configuration parameters, the particular cloud-based tool and the one or more additional assets may be built (e.g., preparing relevant configuration files for deployment) and deployed to the user cloud-based computing environment, as shown in FIG. 7B as 716. A status corresponding to deployment of the particular cloud-based tool (and/or the one or more additional assets) may be displayed on the client device. Additionally, or alternatively, a logfile may be generated corresponding to deployment of the particular cloud-based tool (and/or the one or more additional assets) in the user cloud-based computing environment for reporting and/or debugging purposes.

FIG. 8 is an overview of a process flow 800 that may be implemented by a cloud service provider in an exemplary embodiment of the present disclosure. Process flow 800 may, for example, be used to implement the various functions and features of asset creation, registration, assembly, and deployment of assets as described below.

In this embodiment, the four pillars of process flow 800 include a common schema 802, a search 803, an assemble 804, and an automation 805. Common schema 802 includes a common structure that is used to define assets, which are then registered in common schema 802 in a data catalog. Search 803 implements a text search for a user, and collates the appropriate assets found in the data catalog for presentation to a user. Assemble 804 is used to assemble the assets selected by the user into a solution, and automation 805 utilizes the deployable asset solution to automatically deploy assets to the customer's tenancy at the cloud service provider. Assets may refer to any digital entity such as documents, text, image, media, programs, software images produced, maintained, or managed by an organization.

As discussed previously, a cloud service provider may utilize one or more deployment components, which are part of automation 805, in order to manage the deployment of assets to a customer tenancy (which may also be referred to as a user computing environment). Automation 805 should ensure that the success rate of a deployment is very high (e.g., more than 99%). This requires that any deployment which the user can perform needs to be certified and tested in a staging area before the asset is released to the production environment (e.g., before an asset is registered in the data catalog and searchable by a user).

In some of the embodiments described herein, a deployment blueprint model is described that ensures the successful deployment of new assets to customer tenancies. The blueprint model may define, for example, one or more assets, parameters associated with the one or more assets that define how the one or more assets are deployed in a customer's tenancy, and dependencies. The dependencies may include, for example, the order in which the one or more assets are deployed (e.g., a first asset is deployed prior to a second asset, etc.).

In some embodiments, the deployment blueprint model utilizes terraform scripts. For example, terraform scripts may be stored in object storage (e.g., as a zip file) and a uniform resource locator (URL) may be used to reference the terraform scripts when deploying the one or more assets defined by the deployment blueprint model to the customer's tenancy.

In some embodiments, a new user role called asset deployment assembler is implemented, and the role designs, deploys, and tests the deployment of assets via the deployment blueprint model prior to releasing the solution to the data catalog. This new user role may also generate and/or modify existing terraform scripts, which are stored in the object storage.

At a high level, in some embodiments, the asset information is loaded into the data catalog by a single or bulk upload process. The asset(s) may go through their own approval process for ensuring that they are configured correctly. Once the asset approval process is completed, the asset owner (in cases of a single asset deployment) or the asset deployment assembler (in cases where multiple owners of assets are used) retrieves the details of the assets required for deployment. The asset deployment assembler creates the deployment blueprints with the asset information and state defined as "submitted." At this stage, the deployment blueprints may not be deployed in the production environment of the cloud architecture. For example, at this stage, the deployment blueprints may not be returned to a user of the cloud architecture during a search.

The asset deployment assembler may then source or create the terraform scripts used for the assembly and deployment of the solution. The terraform scripts are tested and certified by the asset owners and/or the asset deployment assembler. Once the terraform scripts are tested and certified, the terraform scripts may be upload to object storage. The asset assembler may then update the deployment blueprint state as "ready to deploy" and also update a pre authenticated request URL of the terraform zip file(s). At this stage, the deployment blueprints are in the production environment of the cloud architecture. For example, at this stage, the deployment blueprints may be returned to a user of the cloud architecture during a search.

Once the solution is deployed in the data catalog, a cloud user may search for the asset(s) via search 803, and the search 803 displays the assets located from the search query along with the possible deployment blueprints associated with the assets. The cloud user may then select the appropriate deployment blueprint and proceed to assemble the assets into a solution (e.g., using assemble 804) and deploy the solution into their tenancy (e.g., using automation 805). During deployment, automation 805 queries the asset database for the asset parameters and displays the asset parameters to the cloud user. The cloud user may then provide any parameter details needed for the deployment into their tenancy. Automation 805 is invoked with the deployment blueprint details and the user supplied parameters. Automation 805 may then invoke a cloud resource manager with the user supplied parameters and apply the job. The result returned by automation 805 includes the information regarding the completed job and any secondary information.

FIG. 9 is a deployment diagram illustrating a deployment blueprint 902 in an exemplary embodiment of the present disclosure. In this embodiment, deployment blueprint 902 references one or more assets 904 and deployment parameters 906 used to deploy the assets 904. Deployment blueprint 902 may not only define the assets 904 for deployment, but also the dependencies of assets 904 (e.g., the order in which assets 904 are deployed). In this embodiment, deployment blueprint 902 includes a deployment blueprint ID 908, a deployment blueprint name 910, a deployment URL 912, and a state 914. Assets 904 associated with deployment blueprint 902 include deployment blueprint ID 908 and an asset ID 916. Deployment parameters 906 include a deployment parameter ID 918, a deployment parameter name 920, and one or more deployment parameter values 922. The combination of deployment blueprint 902, and the reference to assets 904 and deployment parameters 906 comprises a complete solution for deploying assets 904 into a customer's tenancy.

FIG. 10 is a message flow diagram 1000 of a deployment assembler process in an exemplary embodiment of the present disclosure. Flow diagram 1000 may be performed by one or more servers of a cloud architecture 1001 as described below.

An asset owner/deployment assembler 1002 queries 1004 a frontend deployment assembly 1006 for the assets 904 that need to be deployed. Frontend deployment assembly 1006 may be referred to as an assembly service in some embodiments, and the assembly service may be implemented by one or more servers of cloud architecture 1001.

Frontend deployment assembly 1006 returns 1008 the details of the assets 904 to be deployed. Asset owner/deployment assembler 1002 then assembles 1010, creates the terraform scripts for the deployment, and uploads the terraform scripts to object storage. Asset owner/deployment assembler 1002 then creates 1012 deployment blueprint 902, which is forwarded to frontend deployment assembly 1006. Frontend deployment assembly 1006 then stores 1014 deployment blueprint 902 in an asset database 1016. Asset database 1016 may be implemented as one or more object storage in some embodiments. In these embodiments, asset database 1016 may be implemented by the one or more servers of cloud architecture 1001.

Asset owner/deployment assembler 1002 then approves 1018 the deployment blueprint, and frontend deployment assembly 1006 updates 1020 the state of deployment blueprint 902 in asset database 1016 to deploy.

FIG. 11 is a message flow diagram 1100 of a deployment process in an exemplary embodiment of the present disclosure. Flow diagram 1100 may be performed by one or more servers of cloud architecture 1001 as described below.

A user 1102 queries 1104 common schema and data catalog services (CSDCS) 1106 to perform a search for assets 904. In some embodiments, CSDCS 1106 may be implemented by one or more servers of cloud architecture 1001.

In response to the query from user 1102, CSDCS 1106 returns the details of assets 904 and deployment blueprint 902 to user 1102. For instance, CSDCS 1106 returns deployment blueprint 902, assets 904, and deployment parameters 906 previously described with respect to FIGS. 9 and 10. User 1102 invokes 1108 deployment blueprint 902 and CSDCS 1106 queries 1110 asset database 1016 (see FIG. 10) for the parameters of the assets involved (e.g., deployment parameters 906 of FIG. 9). CSDCS 1106 shows 1112 deployment parameters 906 to user 1102, and user 1102 makes changes to deployment parameters 906 as needed and provides updates 1114 to deployment parameters 906 to CSDCS 1106. CSDCS 1106 invokes 1116 deployment blueprint 902 with the supplied parameters, which triggers a deployer 1118 to invoke 1120 the deployment (e.g., using the terraform scripts previously described to deploy assets 904) at a customer tenancy 1122. In some embodiments, deployer 1118 may be referred to as a deployer service, which is implemented by one or more servers of cloud architecture 1001. Flow diagram 1100 further illustrates that results 1124, 1125, 1126 of the deployment are returned back to user 1102.

FIG. 12 depicts a cloud architecture 1200 in an exemplary embodiment of the present disclosure. Cloud architecture 1200 may, for example, implement the previously described functionality for creation, registration, assembly, and deployment of assets 904. In this embodiment, cloud architecture 1200 includes a corporate IT network 1202 and production tenancy 1204. Production tenancy 1204 includes a provider virtual cloud network (VCN) 1208 and a development VCN 1208. Provider VCN includes a network compartment 1210, a security compartment 1212, a public subnet 1214, a private subnet 1216, a database subnet 1218, and an OSN component 1220. Development VCN 1208 includes a private subnet 1222 and a network compartment 1224. In cloud architecture 1200, an end user 1226 from corporate IT network 1202 interacts with the components of provider VCN 1206 and development VCN 1208 via a dynamic routing gateway (DRG) 1228. Private subnet 1216 may implement various services 1230, 1231, 1232, 1233, 1234 (e.g., via one or more virtual machines) similar to those previously described to implement creation, registration, assembly, and deployment of assets 904, such as common schema 802, search 803, assemble 804, automation 805 (see FIG. 8), frontend deployment assembly 1006 (see FIG. 10), CSDCS 1106, and deployer 1118 (see FIG. 10). In this embodiment, database subnet 1218 may store one or more databases 1236 (e.g., asset database 1016, see FIG. 10) used to store assets 904, deployment blueprints 902, deployment parameters 906, terraform scripts, and the like.

Cloud architecture 1200 may operate in a manner similar to that previously described with respect to FIGS. 8, 10, and 11. For example, a frontend service 1238 may implement a user interface (UI) which allows a user to search for assets 904, and provide search results to the user which details which assets 904 are deployable or non-deployable in customer tenancy 1122. The user may then select the deployable asset 904 and frontend service 1238 may then retrieve the details of the deployable asset 904 through asset discover service 1232. When the user selects deploy, frontend service 1238 may then retrieve the operational parameters of the deployable asset 904 via asset discovery service 1232. The user may then provide the required information for deploying the deployable asset 904. Frontend service 1238 may then invoke a deployer service 1233 and contact asset discovery service 1232 to retrieve a URL for deployment blueprint 902. Deployer service 1233 downloads the executable scripts associated with deployment blueprint 902, utilizes a resource manager service 1240 for deployment to customer tenancy 1122, and provides a job ID back to frontend service 1238. Frontend service 1238 tracks the deployment status of the job ID and dynamically shows the progress of the deployment status using the UI to the user. Once frontend service 1238 indicates the deployment to customer tenancy 1122 is complete, the user may then begin using asset 904 in their customer tenancy 1122.

The use of deployment blueprints and the associated methodology around designing, testing, and deploying such deployment blueprints in a test environment prior to providing solutions to production provides a number of benefits over the art, including but not limited to (1) pre-determining the readiness and success rate of deployable assets by implementing an asset certification process (e.g., defining, assembling, and testing the asset before it's published in the cloud system for users to consume; (2) re-certifying assets to account for dependency changes both within and external to the environment (e.g., version changes, etc.); and (3) multi-technology support of the assembly and deployment process using terraform, ansible, or other executable scripts.

In some cases, a solution expert in an organization can generate a number of re-usable assets 904 for the organization. There are at least two different kinds of assets 904, namely: dynamic assets 904 such as programs and scripts, and static assets 904 such as templates, slides, and white papers. Dynamic assets 904 can be shared in different forms. For example, dynamic assets 904 can be shared as downloadable artefacts, and/or can be shared using a marketplace platform, etc. These shared dynamic assets 904 may be self-contained and may require that they are integrated manually outside of the mechanism used to offer them. However, other more complicated scenarios may exist. For example, with two assets 904, the first asset 904 may be a landing zone terraform template, while the second asset 904 may be a LAMPP stack terraform template. When the first asset 904 is deployed, the terraform output of the first asset 904 may be recorded and provided as the input variables for deploying the second asset 904.

In some of the embodiments described herein, an assembly service is described (e.g., one or more services that implement the functionality of assemble 804, see FIG. 8) that enables the creation of a solution from assets 904. A solution may then be directly used by other applications as a single unit. In some embodiments, the assembly service uses two different models. One model uses the metadata of assets 904, and the other model uses a solution repository.

The metadata of assets 904 describes how an asset 904 can be instantiated. This may be analogous to the concept of a class in object-oriented programming. An asset 904 can be instantiated, and when instantiated, it can be combined with another instance of an asset 904 to form a solution. The instance of an asset 904 in this case is analogous to an object in object-oriented programming.

One aspect of asset 904 is the concept of property and requirement. A property is a feature or a capability of asset 904. A simple example would be that if an Oracle database were asset 904, it would deliver a SQL compliant interface. Another asset 904, for example, a MySQL database, may also deliver a SQL compliant interface. For this pair of assets 904, a SQL compliant interface is a property. On the contrary, in another example, a web application asset 904 may require a SQL compliant interface to store its data. This requirement can be satisfied by either the Oracle database asset 904 or the MySQL database asset 904 for the web application asset 904. The property and requirement pair provides a soft dependency between assets 904, and assets 904 may not depend on each other directly.

Further, asset 904 may have a set of operations associated with it (e.g., installation, scale, etc.). For each operation there may be an associated template and a template type. The template may be modelled at the operation level instead of the asset level because a template can be declarative (e.g., terraform) or can be imperative (e.g., a set of scripts to complete the operation). When a template is imperative, the template may be specific to an operation, and the operation has a set of input and output parameters.

A solution repository describes a model for instantiated solutions, which in turn, describes instantiation of assets 904. A solution may be made of one or more items. A solution item is therefore an instance of asset 904. Further, a solution item can be part of one or more solutions as well.

In the assembly process (at a high level), the client (e.g., a portal of the cloud service provider) submits a request to create a solution using the assembly service. The main input of this request may be a set of asset identifiers, where the identifiers can be found in the repository of metadata of assets 904. At this stage, the solution consists of disparate, unrelated assets 904. The client may then request the list of parameters needed to provision the solution. The assembly service may then combine parameters of all assets 904 and returns to the client a combined list. From the returned parameters, the client can update the values of the parameters. The values can be concrete values or placeholder values. For example, a solution may exist that consists of a database asset 904 and a web application asset 904. When provisioning the database asset 904, there may be inputs such as the name of the database, and in this example, the value of the input is concrete. The output of that provisioning can be the URL to connect to that database. The input parameter of the web application may include the URL of the database. In this case, the client can provide a placeholder value, e.g., $ {parameter_name_for_URL_parameter}. This value will be populated by the deployment service (e.g., by automation 805 of FIG. 8 and/or deployer 1118 of FIG. 11) during deployment time. Once the client provides the placeholder value, the two assets 904 are associated with each other and no longer disparate and unrelated.

When two assets 904 are related, the property of the first asset 904 can be used to resolve the requirement of the second asset 904. For example, if database asset 904 has a property of "SQL Compliant Interface" and web application asset 904 has a requirement of "SQL Compliant Interface", database asset 904 resolves the requirement of web application asset 804. After values are updated, the client can request the assembly service (e.g., assemble 804 of FIG. 8 and/or frontend deployment assembly 1006 of FIG. 10) to provide a list of unresolved requirements. Sometimes a solution may have unresolved requirements, and these requirements may be resolved by something outside of the cloud infrastructure. The client may then confirm that the unresolved requirements are resolved somewhere else.

The process above describes the simplest form of the assembly process, where the chaining of assets is done manually by providing placeholder values. However, the assembly service can provide a recommendation to the client based on a few strategies including the following:

The assembly service may implement rule-based mapping. Further, the assembly service may also include solution templates. The solution templates define included assets 904 and deployment parameters 906 that maps between those assets 904. When the client creates a solution, instead of providing a list of assets 904, the client submits the identifier of the solution template.

The assembly service may provide suggestions based on a property-and-requirement pair. Further, the assembly service may recommend placeholder values based on property-and-requirement pair. Using the example provided earlier, when the solution is made of database asset 904 and web application asset 904, the assembly service will provide a recommendation to the client that the input parameter of the web application asset 904 is populated using the output of the database asset 904. This relies on a naming convention where the input parameter name of the web application asset 904 must also match the output parameter name of the database asset 904.

To improve the strategy above, the assembly service may also rely on commonly used mapping to provide a recommendation. This helps where two assets 904 have different names between the output parameter name from the first asset 904, with the input parameter of the second asset 904.

The following scenarios may be validated when the client provides placeholder values to chain multiple assets 904:

- Cyclical dependency-when the client maps parameters between three or more assets 904 that result in a cyclical dependency, the assembly service may reject the mapping.
- Transitive dependency-when asset A 904 resolves the requirement of asset B 904, and asset B 904 resolves the requirement of asset C 904, the property of asset A 904 can also resolve the requirements of asset B 904.
- Version dependency-a requirement can be used to express a version e.g., "Feature A, version 2.0 or later."
- Conditional dependency-ability to apply "AND" or "OR" logic to a set of requirements. For example, a database asset may require a "DB Subnet" or a "Private Subnet."
- Exclusion dependency—this is to declare that a feature must not exist for asset 904 to be provisioned.

There are many advantages to the solution described above, including but not limited to: (1) presenting assets as a unified solution; (2) reducing the time required to determine the reusability of the previously developed assets; (3) mapping asset dependencies and capturing their features; and (4) enabling the administrators to detect critical assets.

Further to the features described above, the cloud service provider may additionally provide CSDCS, as previously described with respect to FIG. 11. The cloud service provider may also provide an agnostic platform in which enables organizations to manage the life cycle of digital assets in a unified way. In some cases, organizations may have millions of assets 904. The cloud service provider may additionally provide a process of cognitive search capabilities for the assets 904, with a semantic analysis of the assets including the Knowledge Graph & Ontology representation, such that the complete automation of selected assets 904 which will be assembled & deployed onto appropriate customer tenancy 1122. This process significantly improves the operational efficiency related to the time, cost & maintenance of assets 904. The asset lifecycle may be visualized by providing a Unified User Interface & Experience (UI/UX). This service may exist as a microservice with an API interface provided by the cloud service provider.

Organizations invest in building many assets 904 over different projects. It is common that the development lifecycle of assets 904 are poorly tracked. This can occur due to many reasons, such as modifications to a team working on assets 904, changing requirements of assets 904, changing priorities and scopes for assets 904, etc. Further, different parts of a larger organizations may not necessarily be aware of the existence of some assets 904 handled elsewhere in the organization. In some cases, duplication of asset efforts can potentially take place. Within the same organization, over a period of time, some assets 904 are neglected and no longer used, regardless of their potential. Further, various teams may end up reinventing some of these assets 904, resulting in major opportunity costs, delays, and relevant losses. Furthermore, currently available tools are transaction focused and thus, are not as comprehensive as CSDCS described herein. Further, the currently available tools are either niche, do not support cloud, lack asset discovery and knowledge management tools and/or are not scalable.

CSDCS described herein may be composed of a number of other sub-systems, where each sub-system is responsible to cover a specific part of the process. This allows the organization to discover, manage and create a database of assets 904. Thus, problems such as duplication can potentially decrease due to the re-deployment of assets 904. Furthermore, through logging and managing deployment of assets 904, it is possible to reduce the burden on the transactions management of assets 904. As the authentication of the users and the access at a large scale and in real-time would not be possible in any other way. Additionally, the platform provides many supporting tools, which enhance user experience and improve the quality of the assets over time.

CSDCS described herein may implement a unique asset discovery and registry of assets (e.g., millions of assets 904), implement a cognitive search engine, and provide assembly and deployment of assets to the cloud, etc.

There are many advantages associated with such services for its end users, such as organizations and cloud service users. These advantages include but are not limited to: (1) avoiding reinventing the wheel by incorporating previous work on assets into the development process for new assets; (2) enabling new employees to browse, search, and access previous asset work; (3) allowing for the development of add-ons to provide suggestions for the developers to reuse previous asset work; (4) helping managers supervise the development of the assets in their organization by viewing what percentage of them are approved and otherwise; (5) maintaining collected information and providing services on a cloud based infrastructure using autonomous database, thereby integrating several other components in terms of APIs and their core process; and (6) reducing the time needed to find relevant information on the assets.

FIG. 13 is a flow chart of a computer-implemented method 1300 in an exemplary embodiment. Computer-implemented method 1300 may be performed by cloud architectures 1001, 1200, computer system 1400, or other systems, not shown or described.

Computer-implemented method 1300 begins by implementing 1302, by one or more servers of a cloud architecture, an assembly service, a user computing environment, and at least one object storage configured to store a plurality of assets that are deployable in the user computing environment. For example, one or more servers of cloud architecture 1001 implement frontend deployment assembly 1006, asset database 1016, and customer tenancy 1122 (which may also be referred to as a user computing environment; see FIGS. 10, 11).

Computer-implemented method 1300 continues in this embodiment by receiving 1304, by the assembly service, a query for at least one asset of the plurality of assets. For example, asset owner/deployment assembler 1002 queries frontend deployment assembly 1006 for assets (see FIG. 10).

Computer-implemented method 1300 continues in this embodiment by returning 1306, by the assembly service, information for the at least one asset. For example, frontend deployment assembly 1006 queries asset database 1016 for information about the assets and returns the information to asset owner/deployment assembler 1002 (see FIG. 10).

Computer-implemented method 1300 continues in this embodiment by receiving 1308, by the assembly service, a deployment blueprint that defines a deployment of the at least one asset in the user computing environment and at least one executable script for deploying the at least one asset, where the deployment blueprint is defined based on the information provided and includes a link to the at least one executable script. For example, frontend deployment assembly 1006 receives the deployment blueprint 902 from asset owner/deployment assembler 1002 (see FIGS. 9, 10).

Computer-implemented method 1300 continues in this embodiment by storing 1310, by the assembly service, the deployment blueprint in the object storage. For example, frontend deployment assembly 1006 stores deployment blueprint 902 in asset database 1016 (see FIGS. 9, 10).

In an optional embodiment, computer-implemented method 1300 further comprises implementing, by the one or more servers, a CSDCS and a deployer service. For example, one or more servers of cloud architecture 1001 implement CSDCS 1106 and deployer 1118 (see FIG. 11).

In this optional embodiment, computer-implemented method 1300 further comprises receiving, by the CSDCS from a user, a search request for the at least one asset, and returning, by the CSDCS to the user in response to the search request, information regarding the at least one of the assets and the deployment blueprint. For example, CSDCS 1106 receives a search request from user 1102 for assets 904, and in response, returns information to user 1102 regarding assets 204 along with deployment blueprint 902.

In this optional embodiment, computer-implemented method 1300 further comprises receiving, by the CSDCS from the user, a request to invoke the deployment blueprint, requesting, by the CSDCS, that the deployer service deploy the at least one asset in the user computing environment based on the deployment blueprint and the at least one executable script, and deploying, by the deployer service, the at least one asset in the user computing environment in response to the request. For example, CSDCS 1106 receives a request from user 1102 to invoke deployment blueprint 902, and in response, CSDCS 1106 requests that deployer 1118 deploy deployment blueprint 902 in customer tenancy 1122. In response to the request to deploy from CSDCS 1106, deployer 1118 deploys deployment blueprint 902 in customer tenancy 1122 (see FIG. 11).

In continuing with this optional embodiment, computer-implemented method 1300 may further comprise querying, by the CSDCS in response to the request to invoke the deployment blueprint, the at least one object storage for asset parameters associated with the at least one asset, and requesting, by the CSDCS, that the deployer service deploy the at least one asset in the user computing environment based on the asset parameters. For example, CSDCS 1106 queries asset database 1016 for asset parameters for assets 904 and instructs deployer 1118 deploy assets 904 in customer tenancy 1122 based on the asset parameters (see FIGS. 9-11).

In continuing with this optional embodiment, computer-implemented method 1300 may further comprise displaying, by the CSDCS in response to the query for the asset parameters, the asset parameters to the user, receiving, by the CSDCS from the user, an update to the asset parameters, and requesting, by the CSDCS, that the deployer service deploy the at least one asset in the customer computing environment based on the update to the asset parameters. For example, CSDCS 1106 displays the asset parameters to user 1102, receives an update to the asset parameters from user 1102, and requests that deployer 1118 deploy assets 904 in customer tenancy 1122 based on the update.

In other optional embodiments, the deployment blueprint includes a state indicator. In these other optional embodiments, computer-implemented method 1300 further includes updating, by the assembly services, the state indicator to indicate that the deployment blueprint is not ready for release to users of the cloud architecture. For example, when frontend deployment assembly 1006 initially stores deployment blueprint 902 in asset database 1016, state 914 of deployment blueprint 902 (see FIG. 9) may be set to "submitted". As a result, deployment blueprint 902 may not be displayed to user 1102 in a search for assets 904.

In continuing with this optional embodiment, computer-implemented method 1300 further comprises receiving, by the assembly service, approval to release the deployment blueprint to production, and updating, by the assembly service, the state indicator to indicate that the deployment blueprint is ready for release to the users in response to the approval. For example, CSDCS 1106 receives approval for deployment blueprint 902 from asset owner/deployment assembler 1002, and updates state 914 of deployment blueprint 902 to "ready to deploy". After updating state 914, blueprint 902 may be displayed to user 1102 in a search for assets 904 (see FIGS. 9-11).

FIG. 14 is a block diagram that illustrates a computer system 1400 upon which an embodiment of the present disclosure may be implemented. Computer system 1400 includes a bus 1402 or other communication mechanism for communicating information, and a hardware processor 1404 coupled with bus 1402 for processing information. Hardware processor 1404 may be, for example, a general-purpose microprocessor.

Computer system 1400 also includes a main memory 1406 such as a random-access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, an optical disk, a flash memory storage device, etc., is provided and coupled to bus 1402 for storing information and instructions.

Computer system 1400 may be coupled via bus 1402 to a display 1412, such as a liquid crystal display (LCD) for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) a second axis (e.g., y), that allows the device to specify positions in a plane.

Computer system 1400 may implement the techniques described herein using customized hard-wired logic, one or more application specific integrated circuits (ASICs) or field programmable gate arrays (FPGAs), firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, flash memory storage devices, etc., such as storage device 1410. Volatile media includes dynamic memory, such as main memory 1406. Common forms of storage media include, for example, a floppy disk, a flexible disk, a hard disk, a solid-state drive, magnetic tape, or any other magnetic data storage medium, a CD-ROM, any other optical data storage medium, any physical medium with patterns of holes, a RAM, a programmable ROM (PROM), and electrically programmable ROM (EPROM), a FLASH-EPROM, non-volatile RAM (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire, and fiber optics, including the wires that comprise bus 1402. Transmission media can also take the form of radio waves or light waves, such as those generated during radio wave and/or infrared data communications.

Various forms of media may be involved in carrying one or more instructions to processor 1404 for execution. For example, the instructions may initially be carried on a magnetic disk or solid-state drive of a remote computer. The remote computer can load the instructions into the remote computer's dynamic memory and send the instructions over a telephone line using a modem. A modem local to computer system 1400 can receive the data on the telephone line and use an infrared transmitter to convert the data to an infrared signal. An infrared detector can receive the data carried in the infrared signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or any type of modem to provide a data communication connection to a corresponding type of telephone line, cable line, and/or a fiber optic line. As another example, communication interface 1418 may be a local area network (LAN) card to provide a data communication connection to a compatible LAN. Wireless links may also be implemented. In any such implementation, communication interface 1418 sends and receives electrical, electromagnetic, or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the worldwide packet data communication network now commonly referred to as Internet 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420, and communication interface 1418. In the Internet example, a server 1430 might transmit a requested code for an application program through Internet 1428, ISP 1426, local network 1422, and communication interface 1418. The received code may be executed by processor 1404 as the code is received, and/or stored in storage device 1410, or other non-volatile storage for later execution.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer system, comprising:

at least one server executing a backend application, the at least one server communicatively coupled with a client device executing a frontend application, wherein the backend application is configured to:

cause to display a user interface of the frontend application on a display of the client device, the user interface including a plurality of input controls including a first input control and a second input control, the first input control configured to enable a user of the client device to input a type of search criterion to be applied to a search, and the second input control configured to receive input from the user of the client device corresponding to a search query term;

in response to receiving a message from the frontend application, determine the type of search criterion and the search query term from the received message;

based on the determined type of search criterion and using the search query term, search a database storing a plurality of cloud-based tools to identify a set of cloud-based tools of the plurality of cloud-based tools, each cloud-based tool of the set of cloud-based tools having pre-assigned properties associated with the search criterion that match the search query term, wherein at least some of the cloud-based tools of the set of cloud-based tools are not yet deployed but are deployable to a user cloud-based computing environment;

for at least a particular cloud-based tool that is not yet deployed from the set of cloud-based tools;

determine a requirement to deploy the particular cloud-based tool to the user cloud-based computing environment; wherein the requirement is satisfied by an asset that is already deployed to the user cloud-based computing environment; wherein the already deployed asset comprises a dynamic asset including software resources that are deployed by a computer system to provide software functionality for the user cloud-based computing environment, and identify additional assets that are needed to satisfy other requirements to deploy the particular cloud-based tool to the user cloud-based computing environment without including the already deployed asset even though the already deployed asset satisfies the requirement to deploy the particular cloud-based tool to the user cloud-based computing environment; wherein the additional assets comprise dynamic assets including software resources that are not yet deployed but are available for deployment by a computer system to provide software functionality for the user cloud-based computing environment;

send, to the client device, a response message, the response message including data corresponding to each cloud-based tool of the set of cloud-based tools and the additional assets identified for at least the particular cloud-based tool;

receive, from the user and based on the response message sent to the client device, a selection of the particular cloud-based tool of the set of cloud-based tools for deployment to the user cloud-based computing environment;

identify initial configuration parameters for deployment of the particular cloud-based tool and the additional assets identified for the selected cloud-based tool; wherein the initial configuration parameters comprise a parameter of the already deployed asset to satisfy the requirement; and build and deploy, to the user cloud-based computing environment, the particular cloud-based tool and the additional assets identified for the particular cloud-based tool using the initial configuration parameters while using the parameter of the already deployed asset to satisfy the requirement;

wherein deployment of the particular cloud-based tool causes the particular cloud-based tool to provide integrated software functionality for the user cloud-based computing environment using the already deployed asset based on the parameter.

2. The computer system of claim 1, wherein:

the first input control includes a radio button;

the second input control includes an input text box; and the determined type of search criterion includes at least one of: a keyword search, an asset identification (ID) search, a cross search, or a natural language search.

3. The computer system of claim 1, wherein the set of cloud-based tools is identified by searching the database using a term-frequency-inverse document frequency (TF-IDF) algorithm.

4. The computer system of claim 1, wherein, to identify the set of cloud-based tools, the backend application is further configured to:

determine a respective ranking score of each cloud-based tool of the set of cloud-based tools corresponding to the search query term; and in accordance with the determined respective ranking score for each cloud-based tool of the set of cloud-based tools, cause to display each cloud-based tool of the set of cloud-based tools.

5. The computer system of claim 4, wherein the respective ranking score is determined using a cosine similarity algorithm.

6. The computer system of claim 1, wherein the search query term corresponds with at least one of: a problem for which the user is searching for a solution, and a cloud-based tool providing a particular service or functionality in the user cloud-based computing environment.

7. The computer system of claim 1, wherein the plurality of cloud-based tools and the set of cloud-based tools includes an artificial intelligence/machine learning asset.

8. The computer system of claim 7, wherein to build and deploy the selected cloud-based tool and the additional assets identified for the selected cloud-based tool, the backend application is further configured to:

resolve a respective value of one or more initial configuration parameters of the initial configuration parameters based on properties of the selected cloud-based tool and the additional assets identified for the selected cloud-based tool; and receive user input for one or more unresolved initial configuration parameters of the initial configuration parameters.

9. The computer system of claim 1, wherein the backend application is further configured to:

cause to display, in the user interface of the frontend application, for a cloud-based tool of the set of cloud-based tools, relationships between the cloud-based tool and the identified additional assets that are needed to deploy to the user cloud-based computing environment as a knowledge graph.

10. The computer system of claim 1, wherein identifying the one or more additional assets is based on at least one requirement of the other requirements that can be satisfied by two different assets that are not yet deployed; wherein the one or more additional assets as identified indicate that either of the two different assets that are not yet deployed may be deployed to satisfy the at least one requirement.

11. The computer system of claim 1, wherein the already deployed asset comprises a software service that is already running in the user cloud-based computing environment.

12. A computer-implemented method, comprising:

causing display of a user interface of a frontend application on a display of a client device, the user interface including a plurality of input controls, the plurality of input controls including a first input control configured to enable a user of the client device to input a type of search criterion to be applied to a search, and a second input control configured to receive input from the user of the client device corresponding to a search query term;

in response to receiving a message from the frontend application, determining the type of search criterion and the search query term from the received message;

based on the determined search criterion and using the search query term, identifying a set of cloud-based tools of a plurality of cloud-based tools by searching a database storing the plurality of cloud-based tools, each cloud-based tool of the set of cloud-based tools having properties associated with the determined type of search criterion that match the search query term, wherein one or more cloud-based tools of the set of cloud-based tools are not yet deployed but are deployable to a user cloud-based computing environment;

for at least a particular cloud-based tool that is not yet deployed from the set of cloud-based tools:

determining a requirement to deploy the particular cloud-based tool to the user cloud-based computing environment; wherein the requirement is satisfied by an asset that is already deployed to the user cloud-based computing environment; wherein the already deployed asset comprises a dynamic asset including software resources that are deployed by a computer system to provide software functionality for the user cloud-based computing environment, and identifying one or more additional assets that are needed to satisfy other requirements to deploy the particular cloud-based tool to the user cloud-based computing environment without including—the already deployed asset even though the already deployed asset satisfies the requirement to deploy the particular cloud-based tool to the user cloud-based computing environment; wherein the additional assets comprise dynamic assets including software resources that are not yet deployed but are available for deployment by a computer system to provide software functionality for the user cloud-based computing environment;

sending, to the client device, a response message, the response message including data corresponding to each cloud-based tool of the set of cloud-based tools and the additional assets identified for at least the particular cloud-based tool;

receiving, from the user and based on the response message sent to the client device, a selection of the particular cloud-based tool of the set of cloud-based tools for deployment to the user cloud-based computing environment;

identifying initial configuration parameters for deployment of the particular cloud-based tool and the additional assets identified for the selected cloud-based tool; wherein the initial configuration parameters comprise a parameter of the already deployed asset to satisfy the requirement; and building and deploying, to the user cloud-based computing environment, the particular cloud-based tool and the additional assets identified for the particular cloud-based tool using the initial configuration parameters while using the parameter of the already deployed asset to satisfy the requirement;

wherein deployment of the particular cloud-based tool causes the particular cloud-based tool to provide integrated software functionality for the user cloud-based computing environment using the already deployed asset based on the parameter.

13. The computer-implemented method of claim 12, wherein:

the first input control includes a radio button;

the second input control includes a text input box; and the determined type of search criterion includes at least one of: a keyword search, an asset identification (ID) search, a cross search, or a natural language search.

14. The computer-implemented method of claim 12, wherein the set of cloud-based tools is identified by searching the database using a term-frequency-inverse document frequency (TF-IDF) algorithm.

15. The computer-implemented method of claim 12, wherein the identifying the set of cloud-based tools further comprises:

determining a respective ranking score of each cloud-based tool of the set of cloud-based tools corresponding to the search query term; and in accordance with the determined respective ranking score for each cloud-based tool of the set of cloud-based tools, causing to display each cloud-based tool of the set of cloud-based tools.

16. The computer-implemented method of claim 15, wherein the respective ranking score is determined using a cosine similarity algorithm.

17. The computer-implemented method of claim 12, wherein the search query term corresponds with at least one of: a problem for which the user is searching for a solution, and a cloud-based tool providing a particular service or functionality in the user cloud-based computing environment.

18. The computer-implemented method of claim 12, wherein the plurality of cloud-based tools and the set of cloud-based tools includes an artificial intelligence/machine learning asset.

19. The computer-implemented method of claim 18, wherein the building and deploying the particular cloud-based tool and the one or more additional assets further comprises:

resolving a respective value of one or more initial configuration parameters of the initial configuration parameters based on properties of the particular cloud-based tool and the one or more additional assets identified for the particular cloud-based tool; and receiving user input for one or more unresolved initial configuration parameters of the initial configuration parameters.

20. The computer-implemented method of claim 12, further comprising:

causing to display, in the user interface of the frontend application, for a cloud-based tool of the set of cloud-based tools, relationships between the cloud-based tool and the identified one or more additional assets that are needed to deploy to the user cloud-based computing environment as a knowledge graph.

21. The computer-implemented method of claim 12, wherein the backend application is configured to identify the additional assets based on at least one requirement of the other requirements that can be satisfied by two different assets that are not yet deployed; wherein the additional assets as identified indicate that either of the two different assets that are not yet deployed may be deployed to satisfy the at least one requirement.

22. The computer-implemented method of claim 12, wherein the already deployed asset comprises a software service that is already running in the user cloud-based computing environment.

23. A non-transitory computer-readable medium embodying programmed instructions which, when executed by at least one processor of a backend system, cause the at least one processor to:

cause to display a user interface of the frontend application on a display of the client device, the user interface including a plurality of input controls including a first input control and a second input control, the first input control configured to enable a user of the client device to input a type of search criterion to be applied to a search, and the second input control configured to receive input from the user of the client device corresponding to a search query term;

in response to receiving a message from the frontend application, determine the type of search criterion and the search query term from the received message;

based on the determined type of search criterion and using the search query term, search a database storing a plurality of cloud-based tools to identify a set of cloud-based tools of the plurality of cloud-based tools, each cloud-based tool of the set of cloud-based tools having pre-assigned properties associated with the search criterion that match the search query term, wherein at least some of the cloud-based tools of the set of cloud-based tools are not yet deployed but are deployable to a user cloud-based computing environment;

for at least a particular cloud-based tool that is not yet deployed from the set of cloud-based tools:

determine a requirement to deploy the particular cloud-based tool to the user cloud-based computing environment; wherein the requirement is satisfied by an asset that is already deployed to the user cloud-based computing environment; wherein the already deployed asset comprises a dynamic asset including software resources that are deployed by a computer system to provide software functionality for the user cloud-based computing environment, and identify additional assets that are needed to satisfy other requirements to deploy the particular cloud-based tool to the user cloud-based computing environment without including the already deployed asset even though the already deployed asset satisfies the requirement to deploy the particular cloud-based tool to the user cloud-based computing environment; wherein the additional assets comprise dynamic assets including software resources that are not yet deployed but are available for deployment by a computer system to provide software functionality for the user cloud-based computing environment;

send, to the client device, a response message, the response message including data corresponding to each cloud-based tool of the set of cloud-based tools and the additional assets identified for at least the particular cloud-based tool;

receive, from the user and based on the response message sent to the client device, a selection of the particular cloud-based tool of the set of cloud-based tools for deployment to the user cloud-based computing environment;

identify initial configuration parameters for deployment of the particular cloud-based tool and the additional assets identified for the selected cloud-based tool; wherein the initial configuration parameters comprise a parameter of the at least one asset that is already deployed asset to satisfy the requirement; and build and deploy, to the user cloud-based computing environment, the particular cloud-based tool and the additional assets identified for the particular cloud-based tool using the initial configuration parameters while using the parameter of the already deployed asset to satisfy the requirement;

wherein deployment of the particular cloud-based tool causes the particular cloud-based tool to provide integrated software functionality for the user cloud-based computing environment using the already deployed asset based on the parameter.

24. The non-transitory computer-readable medium of claim 23, wherein the programmed instructions which, when executed by the at least one processor of the backend system, cause the at least one processor to:

cause to display, in the user interface of the frontend application, for a cloud-based tool of the set of cloud-based tools, relationships between the cloud-based tool and the identified additional assets that are needed to deploy to the user cloud-based computing environment as a knowledge graph.

25. The non-transitory computer-readable medium of claim 23, wherein the backend system is configured to identify the additional assets based on at least one requirement of the other requirements that can be satisfied by two different assets that are not yet deployed; wherein the additional assets as identified indicate that either of the two different assets that are not yet deployed may be deployed to satisfy the at least one requirement.

26. The non-transitory computer-readable medium of claim 23, wherein the already deployed asset comprises a software service that is already running in the user cloud-based computing environment.

* * * * *